(12) United States Patent
Zhang et al.

(10) Patent No.: US 11,671,616 B2
(45) Date of Patent: Jun. 6, 2023

(54) MOTION CANDIDATE DERIVATION

(71) Applicant: Lemon Inc., Grand Cayman (KY)

(72) Inventors: Na Zhang, Beijing (CN); Kai Zhang, Los Angeles, CA (US); Hongbin Liu, Beijing (CN); Li Zhang, Los Angeles, CA (US); Yue Wang, Beijing (CN)

(73) Assignee: Lemon Inc., Grand Cayman (KY)

( * ) Notice: Subject to any disclaimer, the term of this patent is extended or adjusted under 35 U.S.C. 154(b) by 93 days.

(21) Appl. No.: 17/200,628

(22) Filed: Mar. 12, 2021

(65) Prior Publication Data

US 2022/0295088 A1 Sep. 15, 2022

(51) Int. Cl.
*H04N 19/533* (2014.01)
*H04N 19/513* (2014.01)
*H04N 19/137* (2014.01)
*H04N 19/176* (2014.01)
*H04N 19/159* (2014.01)
*H04N 19/105* (2014.01)

(52) U.S. Cl.
CPC ......... *H04N 19/513* (2014.11); *H04N 19/105* (2014.11); *H04N 19/137* (2014.11); *H04N 19/159* (2014.11); *H04N 19/176* (2014.11)

(58) Field of Classification Search
None
See application file for complete search history.

(56) References Cited

U.S. PATENT DOCUMENTS

| | | | |
|---|---|---|---|
| 10,469,869 B1 | 11/2019 | Li et al. | |
| 10,511,852 B1 | 12/2019 | Xu et al. | |
| 11,202,076 B2 | 12/2021 | Laroche et al. | |
| 2016/0286232 A1 | 9/2016 | Li et al. | |
| 2019/0110058 A1 | 4/2019 | Chien et al. | |
| 2019/0124350 A1 | 4/2019 | Thirumalai et al. | |
| 2019/0320197 A1 | 10/2019 | Chen et al. | |
| 2020/0021833 A1 | 1/2020 | Xu et al. | |
| 2020/0128256 A1 | 4/2020 | Laroche et al. | |
| 2020/0137416 A1 | 4/2020 | Esenlik et al. | |
| 2020/0154135 A1 | 5/2020 | Lee | |
| 2020/0204820 A1 | 6/2020 | Zhang et al. | |

(Continued)

OTHER PUBLICATIONS

Jianle Chen et al., "Algorithm Description of Joint Exploration Test Model 7 (JEM 7)", Joint Video Exploration Team (JVET) of ITU-T SG 16 WP 3 and ISO/IEC JTC 1/SC 29/WG 11, 7th Meeting: Torino, IT, Jul. 13-21, 2017, pp. 1-46.

(Continued)

*Primary Examiner* — Christopher G Findley
(74) *Attorney, Agent, or Firm* — ArentFox Schiff LLP

(57) ABSTRACT

Embodiments of the present disclosure provide methods, apparatuses and computer storage media for video processing. One example method comprises determining, during a conversion between a current video block of a video and a bitstream of the video, a set of motion candidates for the current video block; determining, for each motion candidate in the set of motion candidates, a refined motion candidate by performing a local search around the each motion candidate based on a template matching cost rule; determining, from a set of refined motion candidates generated for the set of motion candidates, a target motion candidate for the current video block; and performing the conversion based on the target motion candidate.

22 Claims, 23 Drawing Sheets

(56) References Cited

U.S. PATENT DOCUMENTS

| | | |
|---|---|---|
| 2020/0213612 A1 | 7/2020 | Liu et al. |
| 2020/0221117 A1 | 7/2020 | Liu et al. |
| 2020/0228815 A1 | 7/2020 | Xu et al. |
| 2020/0260119 A1 | 8/2020 | Esenlik et al. |
| 2020/0280736 A1 | 9/2020 | Wang et al. |
| 2020/0314446 A1 | 10/2020 | Tamse et al. |
| 2020/0351513 A1 | 11/2020 | Lee et al. |
| 2020/0351517 A1 | 11/2020 | Jeong et al. |
| 2020/0374544 A1 | 11/2020 | Liu et al. |
| 2020/0382807 A1 | 12/2020 | Liu et al. |
| 2020/0382808 A1 | 12/2020 | Mullakhmetov et al. |
| 2020/0404253 A1 | 12/2020 | Chen et al. |
| 2020/0404320 A1 | 12/2020 | Zhang et al. |
| 2020/0413038 A1 | 12/2020 | Zhang et al. |
| 2020/0413047 A1 | 12/2020 | Li et al. |
| 2021/0006815 A1 | 1/2021 | Ahn et al. |
| 2021/0014523 A1 | 1/2021 | Poirier et al. |
| 2021/0021847 A1 | 1/2021 | Moon et al. |
| 2021/0029362 A1* | 1/2021 | Liu .................. H04N 19/189 |
| 2021/0051339 A1 | 2/2021 | Liu et al. |
| 2021/0076029 A1 | 3/2021 | Han et al. |
| 2021/0084329 A1 | 3/2021 | Venugopal et al. |
| 2021/0092434 A1 | 3/2021 | Huang et al. |
| 2021/0144400 A1 | 5/2021 | Liu et al. |
| 2021/0152843 A1 | 5/2021 | Lee et al. |
| 2021/0185328 A1 | 6/2021 | Xu et al. |
| 2021/0195228 A1 | 6/2021 | Liu et al. |
| 2021/0274214 A1 | 9/2021 | Moon et al. |
| 2022/0060690 A1 | 2/2022 | Sethuraman et al. |
| 2022/0078408 A1 | 3/2022 | Park et al. |

OTHER PUBLICATIONS

"Series H: Audiovisual and Multimedia Systems Infrastructure of audiovisual services—Coding of moving video" High efficiency video coding, ITU-T Telecommunication Standardization Sector of ITU, H. 265, (Nov. 2019).

* cited by examiner

MOTION CANDIDATE DERIVATION

CROSS-REFERENCE TO RELATED APPLICATIONS

This application is related to co-pending U.S. application Ser. No. 17/200,631 to Zhang et al., "MOTION CANDIDATE DERIVATION," filed herewith, and co-pending U.S. application Ser. No. 17/200,632 to Zhang et al., "MOTION CANDIDATE DERIVATION," filed herewith. Both of these applications are hereby incorporated by reference in their entirety.

FIELD

Embodiments of the present disclosure relate to video processing techniques, and more particularly, to methods, apparatuses and computer storage media for motion candidate derivation.

BACKGROUND

In nowadays, digital video capabilities are being applied in various aspects of peoples' lives. Multiple types of video compression technologies, such as MPEG-2, MPEG-4, ITU-TH.263, ITU-TH.264/MPEG-4 Part 10 Advanced Video Coding (AVC), ITU-TH.265 high efficiency video coding (HEVC) standard, versatile video coding (VVC) standard, have been proposed for video encoding/decoding, so as to process digital video information more efficiently.

In a process of video encoding/decoding, motion compensation is used for removing temporal redundancy in a video signal. By motion compensation, a difference between an original signal and a reference signal indicated by motion information may be determined and encoded, thereby increasing a compression efficiency of video coding. Since motion information of a video block may occupy a considerable portion of a bitstream, it would be desirable that motion information of a video block is not signaled but derived at the video decoder.

SUMMARY

Embodiments of the present disclosure provide methods, apparatuses, computer storage media for motion candidate derivation during inter prediction in video coding and decoding.

In a first aspect, a method of video processing is provided. The method comprises: determining, during a conversion between a current video block of a video and a bitstream of the video, a set of motion candidates for the current video block; determining, for each motion candidate in the set of motion candidates, a refined motion candidate by performing a local search around the each motion candidate based on a template matching cost rule; determining, from a set of refined motion candidates generated for the set of motion candidates, a target motion candidate for the current video block; and performing the conversion based on the target motion candidate.

In a second aspect, a method of video processing is provided. The method comprises: determining, during a conversion between a current video block of a video and a bitstream of the video, a set of motion candidates for the current video block; determining, based on a template of the current video block and from the set of motion candidates, a target motion candidate for the current video block by using a template matching cost rule; and performing the conversion based on the target motion candidate; wherein the template is a video region spatially related to the current video block, and the shape of the template is adaptive.

In a third aspect, a method of video processing is provided. The method comprises: determining, during a conversion between a current video block of a video and a bitstream of the video, a set of motion candidates for the current video block; determining, based on a template of the current video block and from the set of motion candidates, a target motion candidate for the current video block by using a template matching cost rule; and performing the conversion based on the target motion candidate; wherein a template matching cost associated with a motion candidate is calculated based on a difference between the template and a reference template, and the reference template is determined based on the template and the motion candidate.

In a fourth aspect, a method of video processing is provided. The method comprises: determining, during a conversion between a current video block of a video and a bitstream of the video, a set of motion candidates for the current video block; determining, based on a template of the current video block and from the set of motion candidates, a target motion candidate for the current video block by using a template matching cost rule; and performing the conversion based on the target motion candidate; wherein a coding mode of the current video block is signaled at one of sequence level, picture level, slice level, sub-picture level, coding tree unit (CTU) level or CU level.

In a fifth aspect, a method of video processing is provided. The method comprises: determining, during a conversion between a current video block of a video and a bitstream of the video, at least one set of motion candidates for the current video block, each motion candidate comprising predicted motion information determined from neighboring video blocks of the current video block; determining, based on a template of the current video block and from the at least one set of motion candidates, a target motion candidate for the current video block by using a template matching cost rule; and performing the conversion based on the target motion candidate.

In a sixth aspect, a method of video processing is provided. The method comprises: determining, during a conversion between a current video block of a video and a bitstream of the video, a motion candidate for the current video block; refining the motion candidate by performing a local search around the motion candidate based on a template matching cost rule; and performing the conversion based on the refined motion candidate, wherein a search order of the local search is related to a coding mode of the current video block.

In a seventh aspect, an apparatus for processing video data is provided. The apparatus comprises a processor and a non-transitory memory with instructions thereon, wherein the instructions upon execution by the processor, cause the processor to perform the method according to any of the above first to sixth aspects.

In an eighth aspect, a non-transitory computer-readable storage medium storing instructions that cause a processor to perform the method according to any of the above first to sixth aspects.

In a ninth aspect, a non-transitory computer-readable recording medium storing a bitstream of a video which is generated by the method according to any of the above first to sixth aspects performed by a video processing apparatus.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

DETAILED DESCRIPTION

Figure 1:
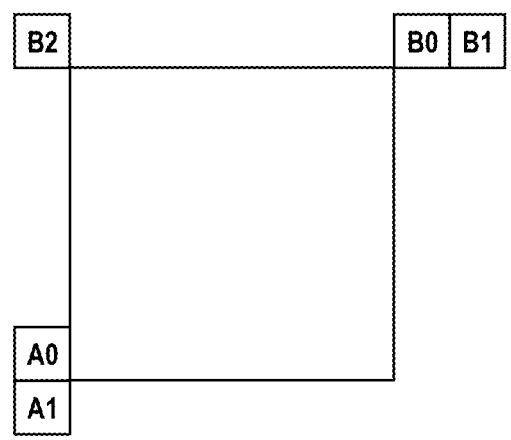
FIG. 1 shows example positions of a spatial merge candidate.

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

Section headings are used in the present disclosure to facilitate ease of understanding and do not limit the embodiments disclosed in a section to only that section. Furthermore, while certain embodiments are described with reference to VVC or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1. Summary

This invention is related to video coding technologies. Specifically, it is related to inter prediction in video coding. It may be applied to the existing video coding standard like HEVC, or the standard (Versatile Video Coding) to be finalized. It may be also applicable to future video coding standards or video codec.

2. Background

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In Apr. 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1. Extended Merge Prediction

In VVC, the merge candidate list is constructed by including the following five types of candidates in order: 1) Spatial MVP from spatial neighbor coding units (CUs); 2) Temporal MVP from collocated CUs; 3) History-based MVP from an first-in-first-out (FIFO) table; and 4) Pairwise average MVP and 5) Zero MVs.

The size of merge list is signalled in sequence parameter set header and the maximum allowed size of merge list is 6. For each CU code in merge mode, an index of best merge candidate is encoded using truncated unary binarization (TU). The first bin of the merge index is coded with context and bypass coding is used for other bins.

The derivation process of each category of merge candidates is provided in this session. As done in HEVC, VVC also supports parallel derivation of the merging candidate lists for all CUs within a certain size of area.

Spatial Candidates Derivation

Figure 2:
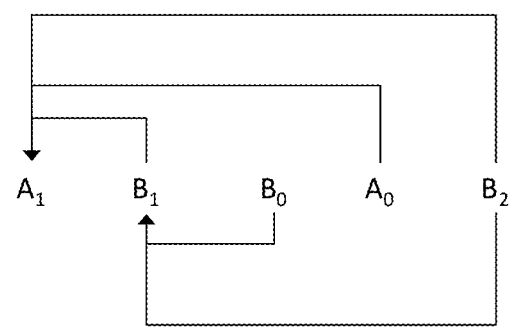
FIG. 2 shows example candidate pairs considered for redundancy check of spatial merge candidates.

The derivation of spatial merge candidates in VVC is same to that in HEVC except the positions of first two merge candidates are swapped. A maximum of four merge candidates are selected among candidates located in the positions depicted in FIG. 1. The order of derivation is B0, A0, B1, A1 and B2. Position B2 is considered only when one or more than one CUs of position B0, A0, B1, A1 are not available (e.g. because it belongs to another slice or tile) or is intra coded. After candidate at position A1 is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 2 are considered and a candidate is only added to the list if the corresponding candidate used for redundancy check has not the same motion information.

Temporal Candidates Derivation

Figure 3:
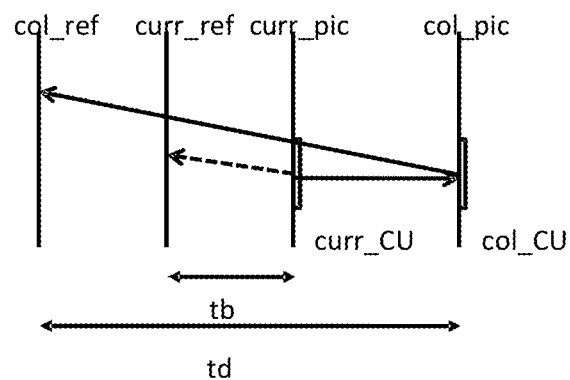
FIG. 3 shows an example of motion vector scaling for a temporal merge candidate.

In this step, only one candidate is added to the list. Particularly, in the derivation of this temporal merge candidate, a scaled motion vector is derived based on co-located CU belonging to the collocated reference picture. The reference picture list to be used for derivation of the co-located CU is explicitly signalled in the slice header. The scaled motion vector for temporal merge candidate is obtained as illustrated by the dotted line in FIG. 3, which is scaled from the motion vector of the co-located CU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero.

Figure 4:
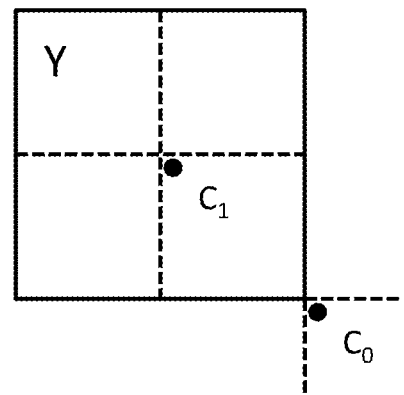
FIG. 4 shows example candidate positions for a temporal merge candidate.

The position for the temporal candidate is selected between candidates C0 and C1, as depicted in FIG. 4. If CU at position C0 is not available, is intra coded, or is outside of the current row of CTUs, position C1 is used. Otherwise, position C0 is used in the derivation of the temporal merge candidate.

History-Based Merge Candidates Derivation

The history-based MVP (HMVP) merge candidates are added to merge list after the spatial MVP and TMVP. In this method, the motion information of a previously coded block is stored in a table and used as MVP for the current CU. The table with multiple HMVP candidates is maintained during the encoding/decoding process. The table is reset (emptied) when a new CTU row is encountered. Whenever there is a non-subblock inter-coded CU, the associated motion information is added to the last entry of the table as a new HMVP candidate.

The HMVP table size S is set to be 6, which indicates up to 6 History-based MVP (HMVP) candidates may be added to the table. When inserting a new motion candidate to the table, a constrained first-in-first-out (FIFO) rule is utilized wherein redundancy check is firstly applied to find whether there is an identical HMVP in the table. If found, the identical HMVP is removed from the table and all the HMVP candidates afterwards are moved forward.

HMVP candidates could be used in the merge candidate list construction process. The latest several HMVP candidates in the table are checked in order and inserted to the candidate list after the TMVP candidate. Redundancy check is applied on the HMVP candidates to the spatial or temporal merge candidate.

To reduce the number of redundancy check operations, the following simplifications are introduced: 1. Number of HMPV candidates is used for merge list generation is set as (N<=4)?M:(8−N), wherein N indicates number of existing candidates in the merge list and M indicates number of available HMVP candidates in the table. 2. Once the total number of available merge candidates reaches the maximally allowed merge candidates minus 1, the merge candidate list construction process from HMVP is terminated.

Pair-Wise Average Merge Candidates Derivation

Pairwise average candidates are generated by averaging predefined pairs of candidates in the existing merge candidate list, and the predefined pairs are defined as {(0, 1), (0, 2), (1, 2), (0, 3), (1, 3), (2, 3)}, where the numbers denote the merge indices to the merge candidate list. The averaged motion vectors are calculated separately for each reference list. If both motion vectors are available in one list, these two motion vectors are averaged even when they point to different reference pictures; if only one motion vector is available, use the one directly; if no motion vector is available, keep this list invalid.

When the merge list is not full after pair-wise average merge candidates are added, the zero MVPs are inserted in the end until the maximum merge candidate number is encountered.

Merge Estimation Region

Merge estimation region (MER) allows independent derivation of merge candidate list for the CUs in the same merge estimation region (MER). A candidate block that is within the same MER to the current CU is not included for the generation of the merge candidate list of the current CU. In addition, the updating process for the history-based motion vector predictor candidate list is updated only if (xCb+cbWidth)>> Log 2ParMrgLevel is greater than xCb>> Log 2ParMrgLevel and (yCb+cbHeight)>> Log 2ParMrgLevel is great than (yCb>> Log 2ParMrgLevel) and where (xCb, yCb) is the top-left luma sample position of the current CU in the picture and (cbWidth, cbHeight) is the CU size. The MER size is selected at encoder side and signalled as log 2_parallel_merge_level_minus2 in the sequence parameter set.

2.2. New Merge Candidates

Non-Adjacent Merge Candidates Derivation

Figure 5:
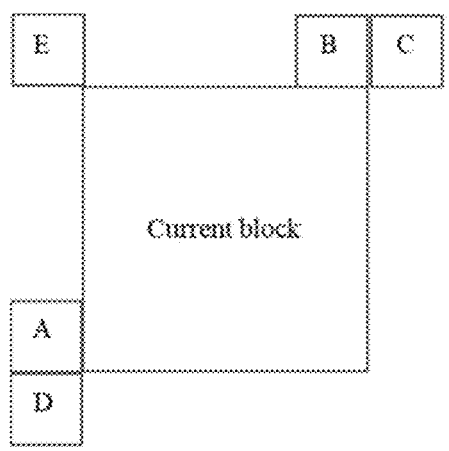
FIG. 5 shows examples of VVC spatial neighboring blocks of the current block.

In VVC, five spatially neighboring blocks shown in FIG. 5 as well as one temporal neighbor are used to derive merge candidates.

It is proposed to derive the additional merge candidates from the positions non-adjacent to the current block using the same pattern as that in VVC. To achieve this, for each search round i, a virtual block is generated based on the current block as follows:

First, the relative position of the virtual block to the current block is calculated by:

$$\text{Offsetx}=-i\times\text{gridX}, \text{Offsety}=-i\times\text{gridY}$$

where the Offsetx and Offsety denote the offset of the top-left corner of the virtual block relative to the top-left corner of the current block, gridX and gridY are the width and height of the search grid.

Second, the width and height of the virtual block are calculated by:

$$\text{newWidth}=i\times 2\times\text{gridX}+\text{currWidth}$$

$$\text{newHeight}=i\times 2\times\text{gridY}+\text{currHeight}.$$

where the currWidth and currHeight are the width and height of current block. The newWidth and newHeight are the width and height of new virtual block, and gridX and gridY are currently set to currWidth and currHeight, respectively.

Figure 6:
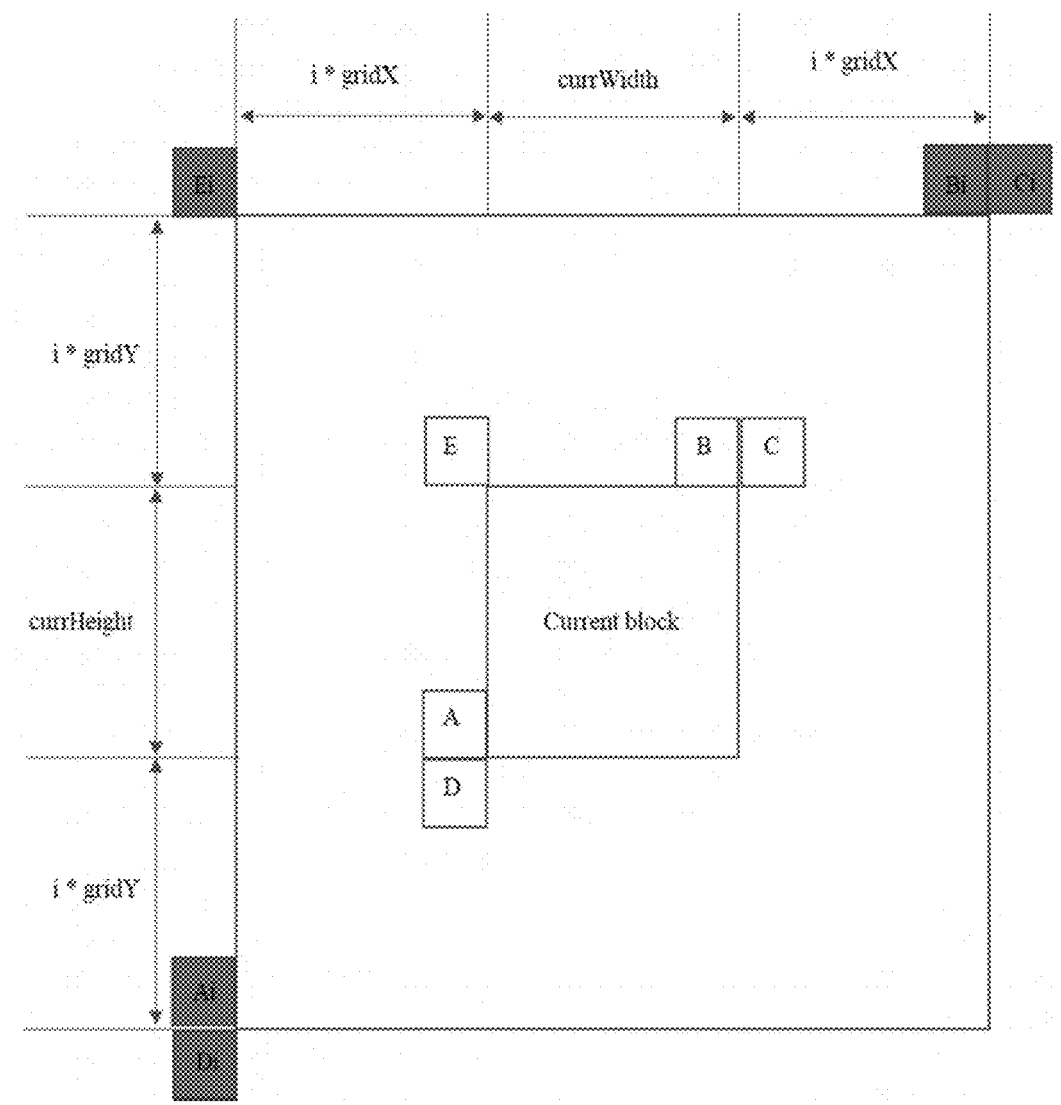
FIG. 6 shows an example of the relationship between the virtual block and the current block.

FIG. 6 illustrates the relationship between the virtual block and the current block. After generating the virtual block, the blocks $A_i$, $B_i$, $C_i$, $D_i$ and $E_i$ can be regarded as the VVC spatial neighboring blocks of the virtual block and their positions are obtained with the same pattern as that in VVC. Obviously, the virtual block is the current block if the search round i is 0. In this case, the blocks $A_i$, $B_i$, $C_i$, $D_i$ and $E_i$ are the spatially neighboring blocks that are used in VVC merge mode.

When constructing the merge candidate list, the pruning is performed to guarantee each element in merge candidate list to be unique. The maximum search round is set to 1, which means that five non-adjacent spatial neighbor blocks are utilized.

Non-adjacent spatial merge candidates are inserted into the merge list after the temporal merge candidate in the order of $B_1 \rightarrow A_1 \rightarrow C_1 \rightarrow D_1 \rightarrow E_1$.

STMVP

It is proposed to derive an averaging candidate as STMVP candidate using three spatial merge candidates and one temporal merge candidate.

STMVP is inserted before the above-left spatial merge candidate.

The STMVP candidate is pruned with all the previous merge candidates in the merge list.

For the spatial candidates, the first three candidates in the current merge candidate list are used.

For the temporal candidate, the same position as VTM/HEVC collocated position is used.

For the spatial candidates, the first, second, and third candidates inserted in the current merge candidate list before STMVP are denoted as F, S, and, T.

The temporal candidate with the same position as VTM/HEVC collocated position used in TMVP is denoted as Col.

The motion vector of the STMVP candidate in prediction direction X (denoted as mvLX) is derived as follows:

1) If the reference indices of the four merge candidates are all valid and are all equal to zero in prediction direction X(X=0 or 1), $$mvLX=(mvLX\_F+mvLX\_S+mvLX\_T+mvLX\_Col)>>2.$$

2) If reference indices of three of the four merge candidates are valid and are equal to zero in prediction direction X(X=0 or 1), $$mvLX=(mvLX\_F\times3+mvLX\_S\times3+mvLX\_Col\times2)>>3$$
or
$$mvLX=(mvLX\_F\times3+mvLX\_T\times3+mvLX\_Col\times2)>>3$$
or
$$mvLX=(mvLX\_S\times3+mvLX\_T\times3+mvLX\_Col\times2)>>3.$$

3) If reference indices of two of the four merge candidates are valid and are equal to zero in prediction direction X(X=0 or 1), $$mvLX=(mvLX\_F+mvLX\_Col)>>1 \text{ or}$$

$$mvLX=(mvLX\_S+mvLX\_Col)>>1 \text{ or}$$

$$mvLX=(mvLX\_T+mvLX\_Col)>>1.$$

It is noted that if the temporal candidate is unavailable, the STMVP mode is off.

Merge list size

If considering both non-adjacent and STMVP merge candidates, the size of merge list is signalled in sequence parameter set header and the maximum allowed size of merge list is 8.

2.3. Merge Mode with MVD (MMVD)

In addition to merge mode, where the implicitly derived motion information is directly used for prediction samples generation of the current CU, the merge mode with motion vector differences (MMVD) is introduced in VVC, which is also known as ultimate motion vector expression. A MMVD flag is signaled right after sending a skip flag and merge flag to specify whether MMVD mode is used for a CU.

In MMVD, a merge candidate (which is called, base merge candidate) is selected, it is further refined by the signalled motion vector difference (MVD) information. The related syntax elements include an index to specify MVD distance (denoted by mmvd_distance_idx), and an index for indication of motion direction (denoted by mmvd_direction_idx). In MMVD mode, one for the first two candidates in the merge list is selected to be used as MV basis (or base merge candidate). The merge candidate flag is signalled to specify which one is used.

Figure 7:
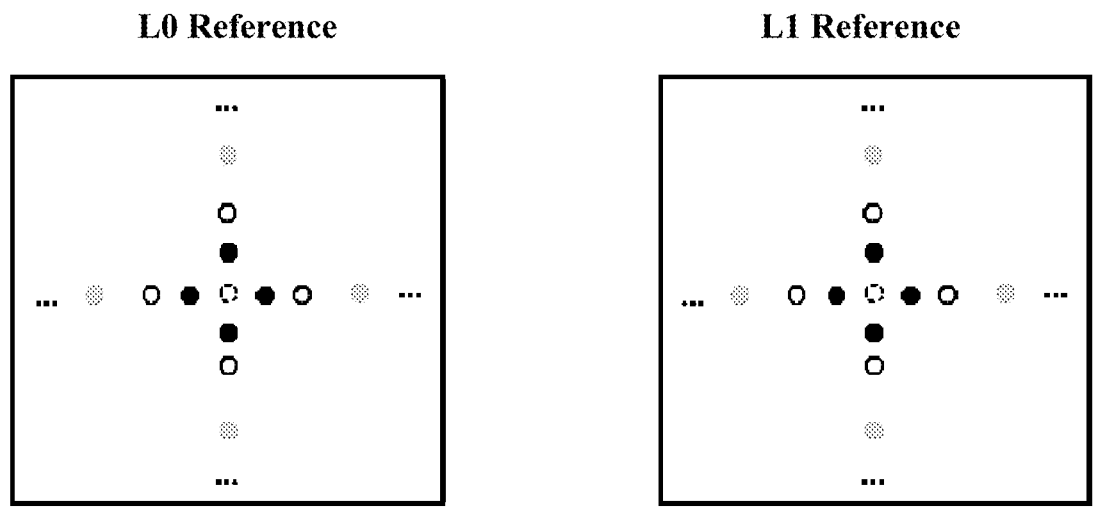
FIG. 7 shows an example of merge mode with motion vector difference (MMVD) search points.

Distance index specifies motion magnitude information and indicate the pre-defined offset from the starting point. As shown in FIG. 7, an offset is added to either horizontal component or vertical component of starting MV. The relation of distance index and pre-defined offset is specified in Table 1.

TABLE 1

The relation of distance index and pre-defined offset

| Distance IDX | 0 | 1 | 2 | 3 | 4 | 5 | 6 | 7 |
|---|---|---|---|---|---|---|---|---|
| Offset (in unit of luma sample) | ¼ | ½ | 1 | 2 | 4 | 8 | 16 | 32 |

Direction index represents the direction of the MVD relative to the starting point. The direction index can represent of the four directions as shown in Table 4. It's noted that the meaning of MVD sign could be variant according to the information of starting MVs. When the starting MVs is an un-prediction MV or bi-prediction MVs with both lists point to the same side of the current picture (i.e. POCs of two references are both larger than the POC of the current picture, or are both smaller than the POC of the current picture), the sign in Table 4 specifies the sign of MV offset added to the starting MV. When the starting MVs is bi-prediction MVs with the two MVs point to the different sides of the current picture (i.e. the POC of one reference is larger than the POC of the current picture, and the POC of the other reference is smaller than the POC of the current picture), the sign in Table 2 specifies the sign of MV offset added to the list0 MV component of starting MV and the sign for the list1 MV has opposite value.

TABLE 2

Sign of MV offset specified by direction index

| Direction IDX | 00 | 01 | 10 | 11 |
|---|---|---|---|---|
| x-axis | + | − | N/A | N/A |
| y-axis | N/A | N/A | + | − |

Derivation of MVD for Each Reference Picture List

One internal MVD (denoted by MmvdOffset) is firstly derived according to the decoded indices of MVD distance (denoted by mmvd_distance_idx), and motion direction (denoted by mmvd_direction_idx).

Afterwards, if the internal MVD is determined, the final MVD to be added to the base merge candidate for each reference picture list is further derived according to POC distances of reference pictures relative to the current picture, and reference picture types (long-term or short-term). More specifically, the following steps are performed in order:

If the base merge candidate is bi-prediction, the POC distance between current picture and reference picture in list 0, and the POC distance between current picture and reference picture in list 1 is calculated, denoted by POCDiffL0, and POCDiffL1, respectively.
  If POCDiffL0 is equal to POCDiffL1, the final MVD for two reference picture lists are both set to the internal MVD.
  Otherwise, if Abs(POCDiffL0) is greater than or equal to Abs(POCDiffL1), the final MVD for reference picture list 0 is set to the internal MVD, and the final MVD for reference picture list 1 is set to the scaled MVD using the internal MVD reference picture types of the two reference pictures (both are not long-term reference pictures) or the internal MVD or (zero MV minus the internal MVD) depending on the POC distances.
  Otherwise, if Abs(POCDiffL0) is smaller than Abs(POCDiffL1), the final MVD for reference picture list 1 is set to the internal MVD, and the final MVD for reference picture list 0 is set to the scaled MVD using the internal MVD reference picture types of the two reference pictures (both are not long-term reference pictures) or the internal MVD or (zero MV minus the internal MVD) depending on the POC distances.

If the base merge candidate is uni-prediction from reference picture list X, the final MVD for reference picture list X is set to the internal MVD, and the final MVD for reference picture list Y (Y=1−X) is set to 0.

MMVD is also known as Ultimate Motion Vector Expression (UMVE).

2.4. Combined Inter and Intra Prediction (CIIP)

Figure 8:
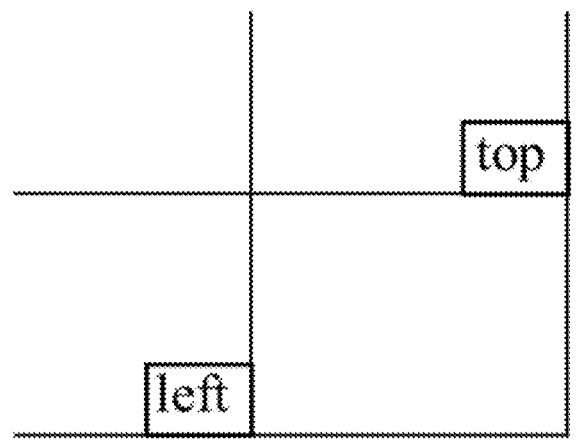
FIG. 8 shows examples of top and left neighboring blocks used in combined inter and intra prediction (CIIP) weight derivation.

In VVC, when a CU is coded in merge mode, if the CU contains at least 64 luma samples (that is, CU width times CU height is equal to or larger than 64), and if both CU width and CU height are less than 128 luma samples, an additional flag is signalled to indicate if the combined inter/intra prediction (CIIP) mode is applied to the current CU. As its name indicates, the CIIP prediction combines an inter prediction signal with an intra prediction signal. The inter prediction signal in the CIIP mode $P_{inter}$ is derived using the same inter prediction process applied to regular merge mode; and the intra prediction signal $P_{inter}$ is derived following the regular intra prediction process with the planar mode. Then, the intra and inter prediction signals are combined using weighted averaging, where the weight value is calculated depending on the coding modes of the top and left neighbouring blocks (depicted in FIG. 8) as follows:
If the top neighbor is available and intra coded, then set isIntraTop to 1, otherwise set isIntraTop to 0;
If the left neighbor is available and intra coded, then set isIntraLeft to 1, otherwise set isIntraLeft to 0;
If (isIntraLeft+isIntraTop) is equal to 2, then wt is set to 3;
Otherwise, if (isIntraLeft+isIntraTop) is equal to 1, then wt is set to 2;
Otherwise, set wt to 1.
The CIIP prediction is formed as follows:

$$P_{CIIP}=((4-wt)*P_{inter}+wt*P_{intra}+2)>>2$$

2.5. Geometric Partitioning Mode (GPM)

In VVC, a geometric partitioning mode is supported for inter prediction. The geometric partitioning mode is signalled using a CU-level flag as one kind of merge mode, with other merge modes including the regular merge mode, the MMVD mode, the CIIP mode and the subblock merge mode. In total 64 partitions are supported by geometric partitioning mode for each possible CU size w×h=$2^m$×$2^n$ with m, n∈{3 . . . 6}excluding 8×64 and 64×8.

Figure 9:
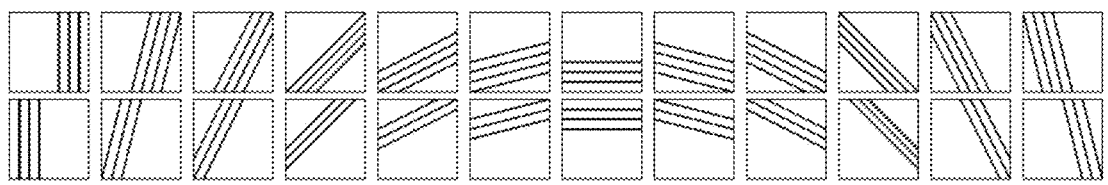
FIG. 9 shows examples of the geometric partitioning mode (GPM) splits grouped by identical angles.

When this mode is used, a CU is split into two parts by a geometrically located straight line (as shown in FIG. 9). The location of the splitting line is mathematically derived from the angle and offset parameters of a specific partition. Each part of a geometric partition in the CU is inter-predicted using its own motion; only uni-prediction is allowed for each partition, that is, each part has one motion vector and one reference index. The uni-prediction motion constraint is applied to ensure that same as the conventional bi-prediction, only two motion compensated prediction are needed for each CU. The uni-prediction motion for each partition is derived using the process described in 2.5.1.

If geometric partitioning mode is used for the current CU, then a geometric partition index indicating the partition mode of the geometric partition (angle and offset), and two merge indices (one for each partition) are further signalled. The number of maximum GPM candidate size is signalled explicitly in SPS and specifies syntax binarization for GPM merge indices. After predicting each of part of the geometric partition, the sample values along the geometric partition edge are adjusted using a blending processing with adaptive weights as in 2.5.2. This is the prediction signal for the whole CU, and transform and quantization process will be applied to the whole CU as in other prediction modes.

Finally, the motion field of a CU predicted using the geometric partition modes is stored as in 2.5.3.

2.5.1 Uni-Prediction Candidate List Construction

Figure 10:
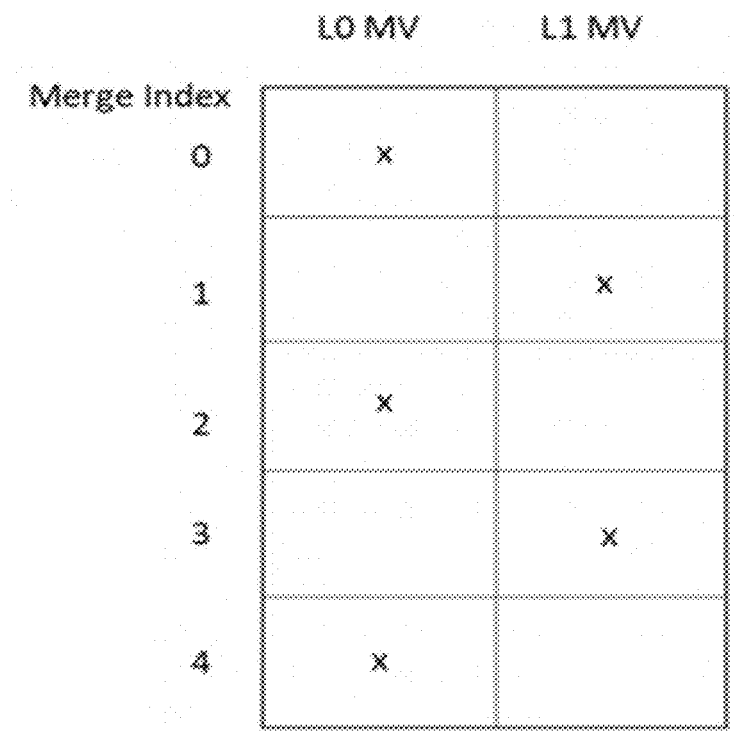
FIG. 10 shows an example of uni-prediction motion vector (MV) selection for the geometric partitioning mode.

The uni-prediction candidate list is derived directly from the merge candidate list constructed according to the extended merge prediction process in 2.1. Denote n as the index of the uni-prediction motion in the geometric uni-prediction candidate list. The LX motion vector of the n-th extended merge candidate, with X equal to the parity of n, is used as the n-th uni-prediction motion vector for geometric partitioning mode. These motion vectors are marked with "x" in FIG. 10. In case a corresponding LX motion vector of the n-th extended merge candidate does not exist, the L(1−X) motion vector of the same candidate is used instead as the uni-prediction motion vector for geometric partitioning mode.

2.5.2 Blending Along the Geometric Partitioning Edge

After predicting each part of a geometric partition using its own motion, blending is applied to the two prediction signals to derive samples around geometric partition edge. The blending weight for each position of the CU are derived based on the distance between individual position and the partition edge.

The distance for a position (x, y) to the partition edge are derived as:

$$d(x, y) = (2x + 1 - w)\cos(\varphi_i) + (2y + 1 - h)\sin(\varphi_i) - \rho_j \qquad (2\text{-}1)$$

$$\rho_j = \rho_{x,j}\cos(\varphi_i) + \rho_{y,j}\sin(\varphi_i) \qquad (2\text{-}2)$$

$$\rho_{x,j} = \begin{cases} 0 & i\ \%\ 16 = 8\ \text{or}\ (i\ \%\ 16 \neq 0\ \text{and}\ h \geq w) \\ \pm(j \times w) \gg 2 & \text{otherwise} \end{cases} \qquad (2\text{-}1)$$

$$\rho_{y,j} = \begin{cases} \pm(j \times h) \gg 2 & i\ \%\ 16 = 8\ \text{or}\ (i\ \%\ 16 \neq 0\ \text{and}\ h \geq w) \\ 0 & \text{otherwise} \end{cases} \qquad (2\text{-}4)$$

where i,j are the indices for angle and offset of a geometric partition, which depend on the signaled geometric partition index. The sign of $\rho_{x,j}$ and $\rho_{y,j}$ depend on angle index i.

The weights for each part of a geometric partition are derived as following:

$$wIdxL(x, y) = partIdx\ ?\ 32 + d(x, y):32 - d(x, y) \qquad (2\text{-}5)$$

$$w_0(x, y) = \frac{Clip3(0, 8, (wIdxL(x, y) + 4) \gg 3)}{8} \qquad (2\text{-}6)$$

$$w_1(x, y) = 1 - w_0(x, y) \qquad (2\text{-}7)$$

Figure 11:
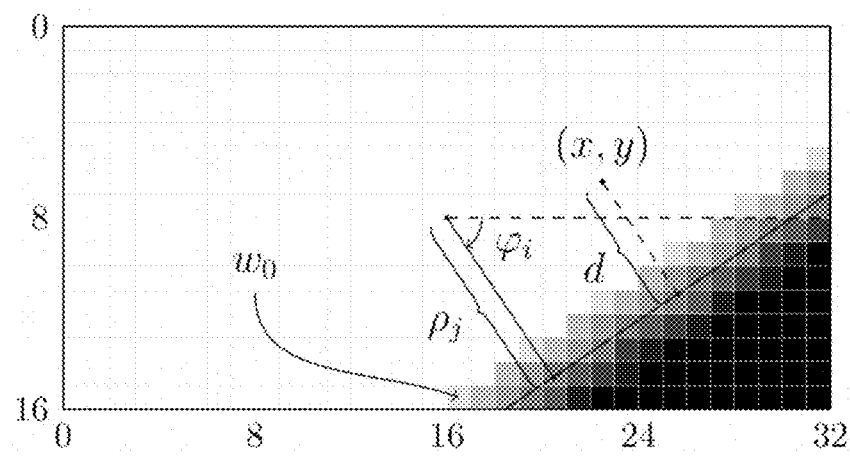
FIG. 11 shows an example of exemplified generation of a bending weight using geometric partitioning mode.

The partIdx depends on the angle index i. One example of weigh $w_0$ is illustrated in FIG. 11.

2.5.3 Motion Field Storage for Geometric Partitioning Mode

Mv1 from the first part of the geometric partition, Mv2 from the second part of the geometric partition and a combined Mv of Mv1 and Mv2 are stored in the motion filed of a geometric partitioning mode coded CU.

The stored motion vector type for each individual position in the motion filed are determined as:

sType=abs(motionIdx)<32?2:(motionIdx≤0?(1× partIdx):partIdx) (2-8)

where motionIdx is equal to d(4x+2, 4y+2), which is recalculated from equation (2-1). The partIdx depends on the angle index i.

If sType is equal to 0 or 1, Mv0 or Mv1 are stored in the corresponding motion field, otherwise if sType is equal to 2, a combined Mv from Mv0 and Mv2 are stored. The combined Mv are generated using the following process:
1) If Mv1 and Mv2 are from different reference picture lists (one from L0 and the other from L1), then Mv1 and Mv2 are simply combined to form the bi-prediction motion vectors.
2) Otherwise, if Mv1 and Mv2 are from the same list, only uni-prediction motion Mv2 is stored.

2.6. Triangle Partition for Inter Prediction

In VVC, a triangle partition mode is supported for inter prediction. The triangle partition mode is only applied to CUs that are 8×8 or larger. The triangle partition mode is signalled using a CU-level flag as one kind of merge mode, with other merge modes including the regular merge mode, the MMVD mode, the CIIP mode and the subblock merge mode.

Figure 12:
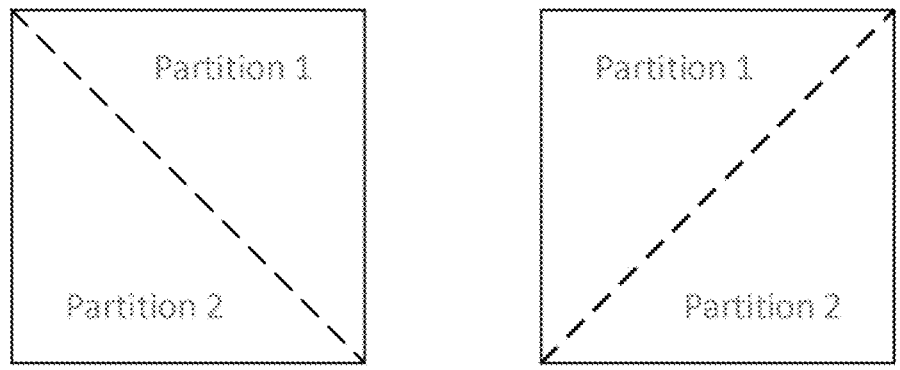
FIG. 12 shows an example of triangle partition based inter prediction.

When this mode is used, a CU is split evenly into two triangle-shaped partitions, using either the diagonal split or the anti-diagonal split (as shown in FIG. 12). Each triangle partition in the CU is inter-predicted using its own motion; only uni-prediction is allowed for each partition, that is, each partition has one motion vector and one reference index. The uni-prediction motion constraint is applied to ensure that same as the conventional bi-prediction, only two motion compensated prediction are needed for each CU. The uni-prediction motion for each partition is derived using the process described in 2.5.1.

If triangle partition mode is used for the current CU, then a flag indicating the direction of the triangle partition (diagonal or anti-diagonal), and two merge indices (one for each partition) are further signalled. The number of maximum TPM candidate size is signalled explicitly at slice level and specifies syntax binarization for TMP merge indices. After predicting each of the triangle partitions, the sample values along the diagonal or anti-diagonal edge are adjusted using a blending processing with adaptive weights. This is the prediction signal for the whole CU, and transform and quantization process will be applied to the whole CU as in other prediction modes. Finally, the motion field of a CU predicted using the triangle partition mode is stored as in 2.5.3.

The triangle partition mode is not used in combination with SBT, that is, when the signalled triangle mode is equal to 1, the cu_sbt_flag is inferred to be 0 without signalling.

2.6.1 Uni-Prediction Candidate List Construction

Figure 13:
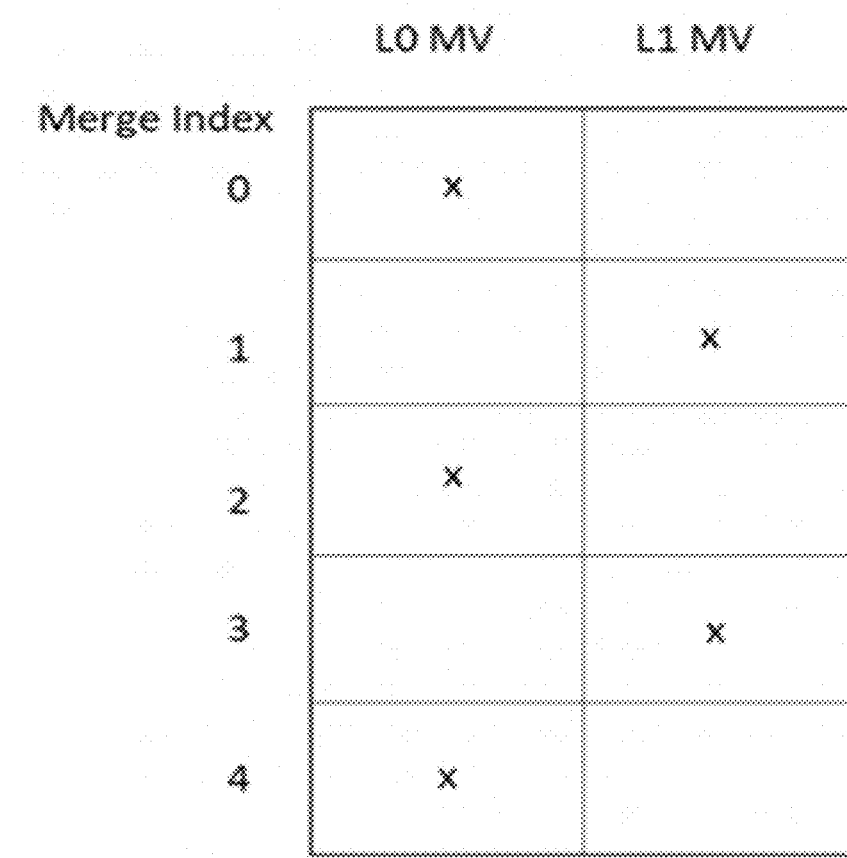
FIG. 13 shows an example of uni-prediction MV selection for the triangle partition mode.

The uni-prediction candidate list is derived directly from the merge candidate list constructed according to the extended merge prediction process in 2.1. Denote n as the index of the uni-prediction motion in the triangle uni-prediction candidate list. The LX motion vector of the n-th extended merge candidate, with X equal to the parity of n, is used as the n-th uni-prediction motion vector for triangle partition mode. These motion vectors are marked with "x" in FIG. 13. In case a corresponding LX motion vector of the n-th extended merge candidate does not exist, the L(1-X) motion vector of the same candidate is used instead as the uni-prediction motion vector for triangle partition mode.

2.6.2 Blending Along the Triangle Partition Edge

Figure 14:
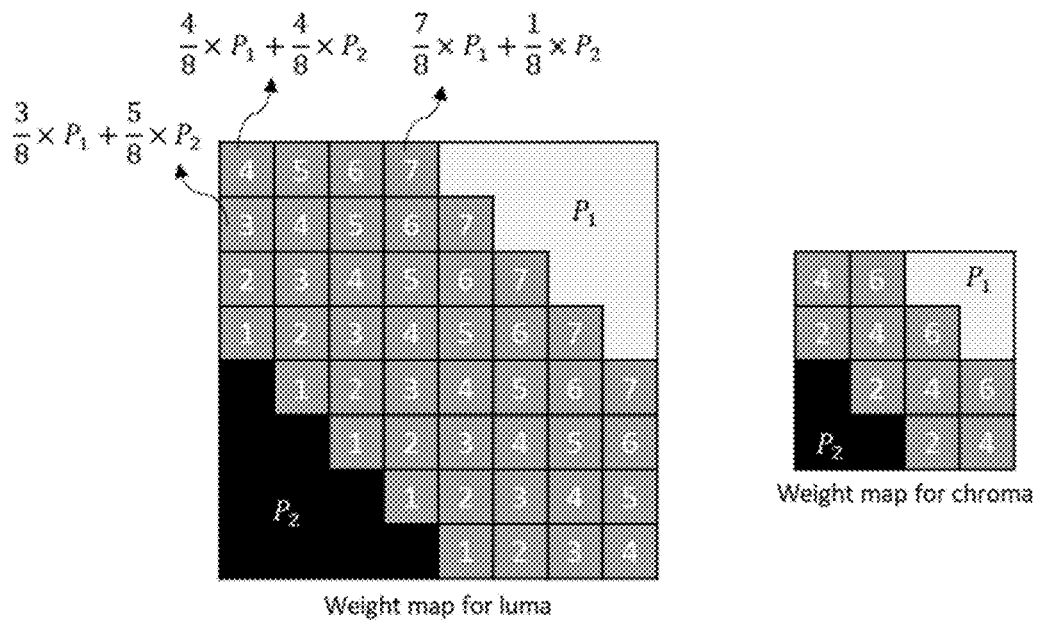
FIG. 14 shows example weights used in the blending process.

After predicting each triangle partition using its own motion, blending is applied to the two prediction signals to derive samples around the diagonal or anti-diagonal edge. The following weights are used in the blending process: {7/8, 6/8, 5/8, 4/8, 3/8, 2/8, 1/8} for luma and {6/8, 4/8, 2/8} for chroma, as shown in FIG. 14.

2.6.3 Motion Field Storage

The motion vectors of a CU coded in triangle partition mode are generated using the following process:
1) If Mv1 and Mv2 are from different reference picture lists (one from L0 and the other from L1), then Mv1 and Mv2 are simply combined to form the bi-prediction motion vector.
2) Otherwise, if Mv1 and Mv2 are from the same list, only uni-prediction motion Mv2 is stored.

2.7. Subblock-Based Temporal Motion Vector Prediction (SbTMVP)

VVC supports the subblock-based temporal motion vector prediction (SbTMVP) method. Similar to the temporal motion vector prediction (TMVP) in HEVC, SbTMVP uses the motion field in the collocated picture to improve motion vector prediction and merge mode for CUs in the current picture. The same collocated picture used by TMVP is used for SbTMVP. SbTMVP differs from TMVP in the following two main aspects:
TMVP predicts motion at CU level but SbTMVP predicts motion at sub-CU level;
Whereas TMVP fetches the temporal motion vectors from the collocated block in the collocated picture (the collocated block is the bottom-right or center block relative to the current CU), SbTMVP applies a motion shift before fetching the temporal motion information from the collocated picture, where the motion shift is obtained from the motion vector from one of the spatial neighboring blocks of the current CU.

Figure 15A:
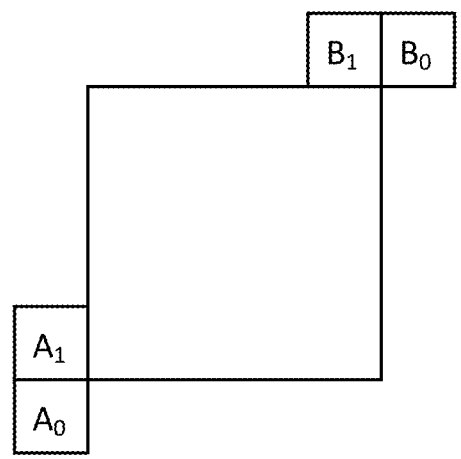
FIG. 15A shows example spatial neighboring blocks used by subblock-based temporal motion vector prediction (SbTMVP).
Figure 15B:
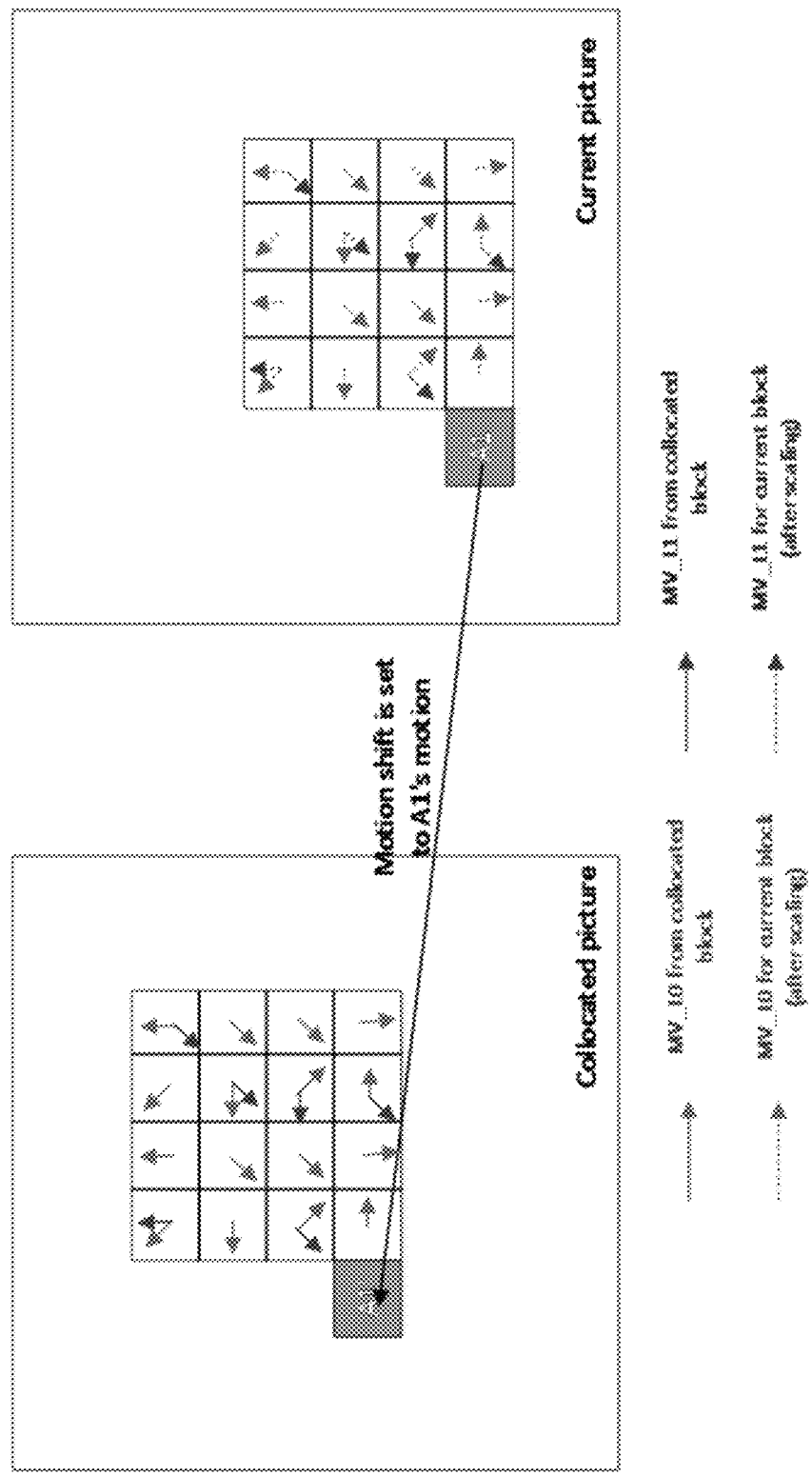
FIG. 15B shows an example of deriving sub-CU motion field by applying a motion shift from spatial neighbor and scaling the motion information from the corresponding collocated sub-CUs.

The SbTMVP process is illustrated in FIG. 15A and FIG. 15B. SbTMVP predicts the motion vectors of the sub-CUs within the current CU in two steps. In the first step, the spatial neighbor A1 in FIG. 15A is examined. If A1 has a motion vector that uses the collocated picture as its reference picture, this motion vector is selected to be the motion shift to be applied. If no such motion is identified, then the motion shift is set to (0, 0).

In the second step, the motion shift identified in Step 1 is applied (i.e. added to the current block's coordinates) to obtain sub-CU-level motion information (motion vectors and reference indices) from the collocated picture as shown in FIG. 15B. The example in FIG. 15B assumes the motion shift is set to block A1's motion. Then, for each sub-CU, the motion information of its corresponding block (the smallest motion grid that covers the center sample) in the collocated picture is used to derive the motion information for the sub-CU. After the motion information of the collocated sub-CU is identified, it is converted to the motion vectors and reference indices of the current sub-CU in a similar way as the TMVP process of HEVC, where temporal motion scaling is applied to align the reference pictures of the temporal motion vectors to those of the current CU.

In VVC, a combined subblock based merge list which contains both SbTMVP candidate and affine merge candidates is used for the signalling of sub-block based merge mode. The SbTMVP mode is enabled/disabled by a sequence parameter set (SPS) flag. If the SbTMVP mode is enabled, the SbTMVP predictor is added as the first entry of the list of subblock based merge candidates, and followed by the affine merge candidates. The size of subblock based merge list is signalled in SPS and the maximum allowed size of the subblock based merge list is 5 in VVC.

The sub-CU size used in SbTMVP is fixed to be 8×8, and as done for affine merge mode, SbTMVP mode is only applicable to the CU with both width and height are larger than or equal to 8.

The encoding logic of the additional SbTMVP merge candidate is the same as for the other merge candidates, that is, for each CU in P or B slice, an additional RD check is performed to decide whether to use the SbTMVP candidate.

2.8. Affine Merge Prediction

AF_MERGE mode can be applied for CUs with both width and height larger than or equal to 8. In this mode the CPMVs of the current CU is generated based on the motion information of the spatial neighboring CUs. There can be up to five CPMVP candidates and an index is signalled to indicate the one to be used for the current CU. The following three types of CPVM candidate are used to form the affine merge candidate list:

Inherited affine merge candidates that extrapolated from the CPMVs of the neighbour CUs;
Constructed affine merge candidates CPMVPs that are derived using the translational MVs of the neighbour CUs;
Zero MVs.

Figure 16:
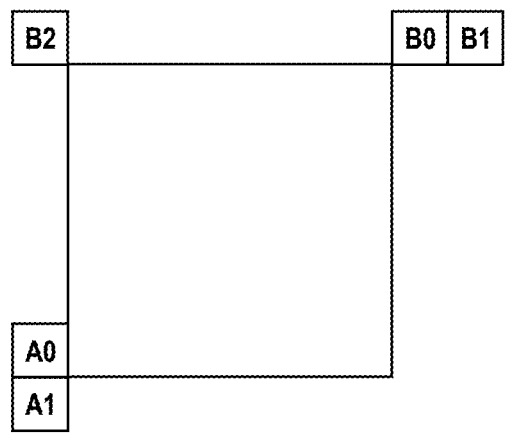
FIG. 16 shows example locations of inherited affine motion predictors.
Figure 17:
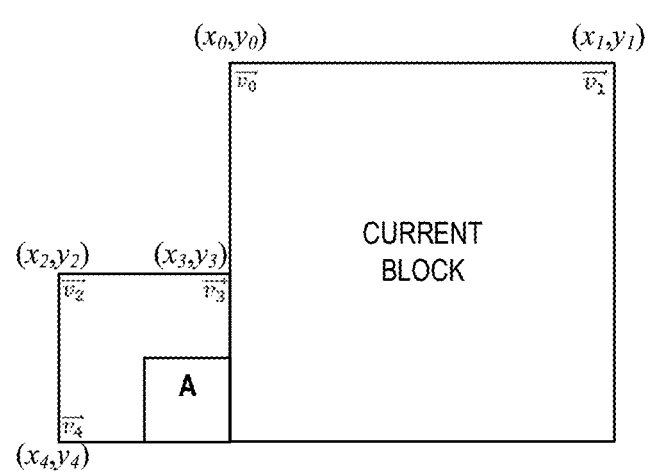
FIG. 17 shows an example of control point motion vector inheritance.

In VVC, there are maximum two inherited affine candidates, which are derived from affine motion model of the neighboring blocks, one from left neighboring CUs and one from above neighboring CUs. The candidate blocks are shown in FIG. 16. For the left predictor, the scan order is A0→A1, and for the above predictor, the scan order is B0→B1→B2. Only the first inherited candidate from each side is selected. No pruning check is performed between two inherited candidates. When a neighboring affine CU is identified, its control point motion vectors are used to derived the CPMVP candidate in the affine merge list of the current CU. As shown in FIG. 17, if the neighbour left bottom block A is coded in affine mode, the motion vectors $v_2$, $v_3$ and $v_4$ of the top left corner, above right corner and left bottom corner of the CU which contains the block A are attained. When block A is coded with 4-parameter affine model, the two CPMVs of the current CU are calculated according to $v_2$, and $v_3$. In case that block A is coded with 6-parameter affine model, the three CPMVs of the current CU are calculated according to $v_2$, $v_3$ and $v_4$.

Figure 18:
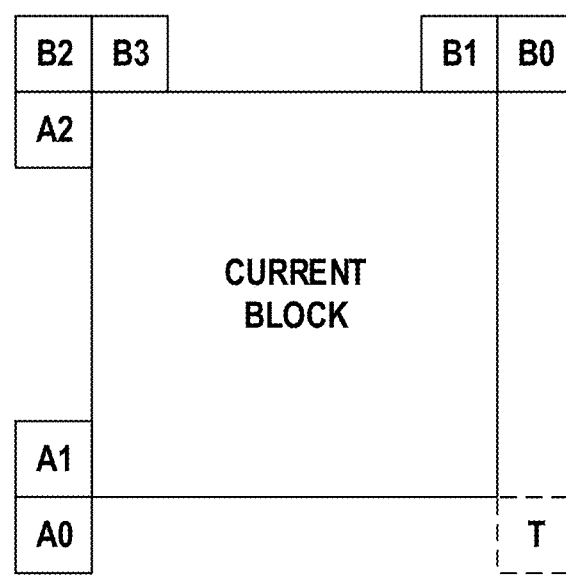
FIG. 18 shows example locations of candidates for the constructed affine merge mode.

Constructed affine candidate means the candidate is constructed by combining the neighbor translational motion information of each control point. The motion information for the control points is derived from the specified spatial neighbors and temporal neighbor shown in FIG. 18. $CPMV_k$ (k=1, 2, 3, 4) represents the k-th control point. For $CPMV_1$, the B2→B3→A2 blocks are checked and the MV of the first available block is used. For $CPMV_2$, the B1→B0 blocks are checked and for $CPMV_3$, the A1→A0 blocks are checked. For TMVP, it is used as $CPMV_4$ if it's available.

After MVs of four control points are attained, affine merge candidates are constructed based on those motion information. The following combinations of control point MVs are used to construct in order: {$CPMV_1$, $CPMV_2$, $CPMV_3$}, {$CPMV_1$, $CPMV_2$, $CPMV_4$}, {$CPMV_1$, $CPMV_3$, $CPMV_4$}, {$CPMV_2$, $CPMV_3$, $CPMV_4$}, {$CPMV_i$, $CPMV_2$}, {$CPMV_i$, $CPMV_3$}.

The combination of 3 CPMVs constructs a 6-parameter affine merge candidate and the combination of 2 CPMVs constructs a 4-parameter affine merge candidate. To avoid motion scaling process, if the reference indices of control points are different, the related combination of control point MVs is discarded.

After inherited affine merge candidates and constructed affine merge candidate are checked, if the list is still not full, zero MVs are inserted to the end of the list.

2.9. Pattern Matched Motion Vector Derivation

Pattern matched motion vector derivation (PMMVD) mode is a special merge mode based on Frame-Rate Up Conversion (FRUC) techniques. With this mode, motion information of a block is not signalled but derived at decoder side.

A FRUC flag is signalled for a CU when its merge flag is true. When the FRUC flag is false, a merge index is signalled and the regular merge mode is used. When the FRUC flag is true, an additional FRUC mode flag is signalled to indicate which method (bilateral matching or template matching) is to be used to derive motion information for the block.

At encoder side, the decision on whether using FRUC merge mode for a CU is based on RD cost selection as done for normal merge candidate. That is the two matching modes (bilateral matching and template matching) are both checked for a CU by using RD cost selection. The one leading to the minimal cost is further compared to other CU modes. If a FRUC matching mode is the most efficient one, FRUC flag is set to true for the CU and the related matching mode is used.

Motion derivation process in FRUC merge mode has two steps. A CU-level motion search is first performed, then followed by a Sub-CU level motion refinement. At CU level, an initial motion vector is derived for the whole CU based on bilateral matching or template matching. First, a list of MV candidates is generated and the candidate which leads to the minimum matching cost is selected as the starting point for further CU level refinement. Then a local search based on bilateral matching or template matching around the starting point is performed and the MV results in the minimum matching cost is taken as the MV for the whole CU. Subsequently, the motion information is further refined at sub-CU level with the derived CU motion vectors as the starting points.

For example, the following derivation process is performed for a W×H CU motion information derivation. At the first stage, MV for the whole W×H CU is derived. At the second stage, the CU is further split into M×M sub-CUs. The value of M is calculated as in (2-9), D is a predefined splitting depth which is set to 3 by default in the JEM. Then the MV for each sub-CU is derived.

$$M = \max\left\{4, \min\left\{\frac{M}{2^D}, \frac{N}{2^D}\right\}\right\} \qquad (2\text{-}9)$$

Figure 19:
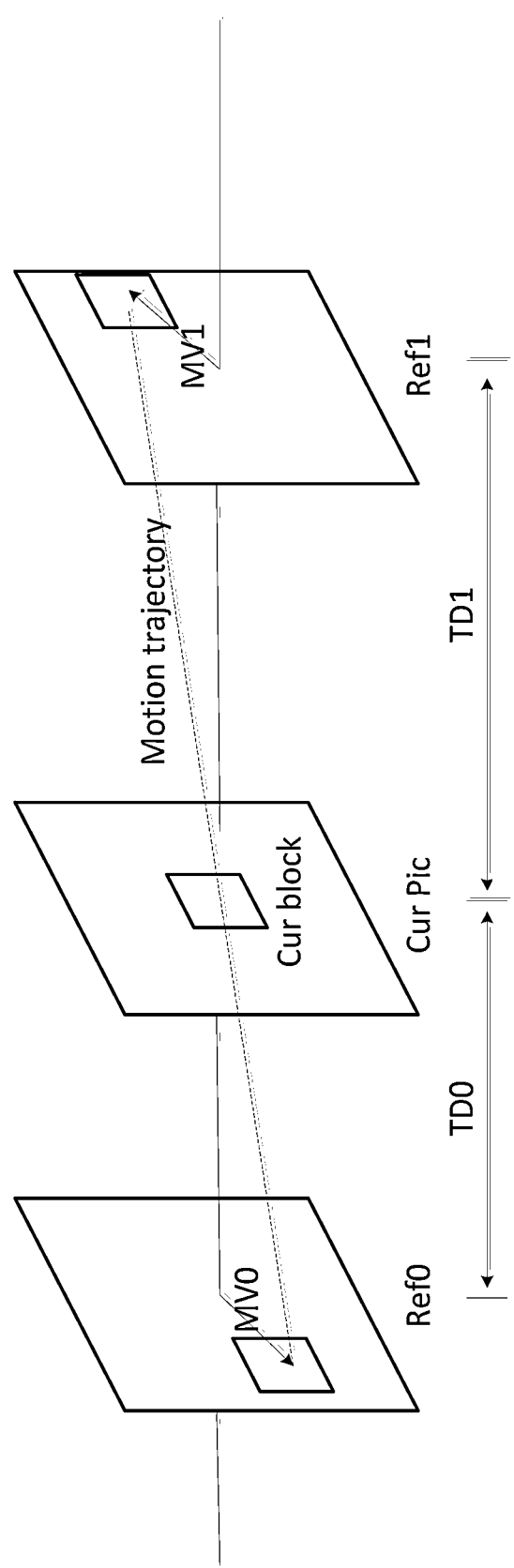
FIG. 19 shows an example of bilateral matching.

As shown in FIG. 19, the bilateral matching is used to derive motion information of the current CU by finding the closest match between two blocks along the motion trajectory of the current CU in two different reference pictures. Under the assumption of continuous motion trajectory, the motion vectors MV0 and MV1 pointing to the two reference blocks shall be proportional to the temporal distances, i.e., TD0 and TD1, between the current picture and the two reference pictures. As a special case, when the current picture is temporally between the two reference pictures and the temporal distance from the current picture to the two reference pictures is the same, the bilateral matching becomes mirror based bi-directional MV.

Figure 20:
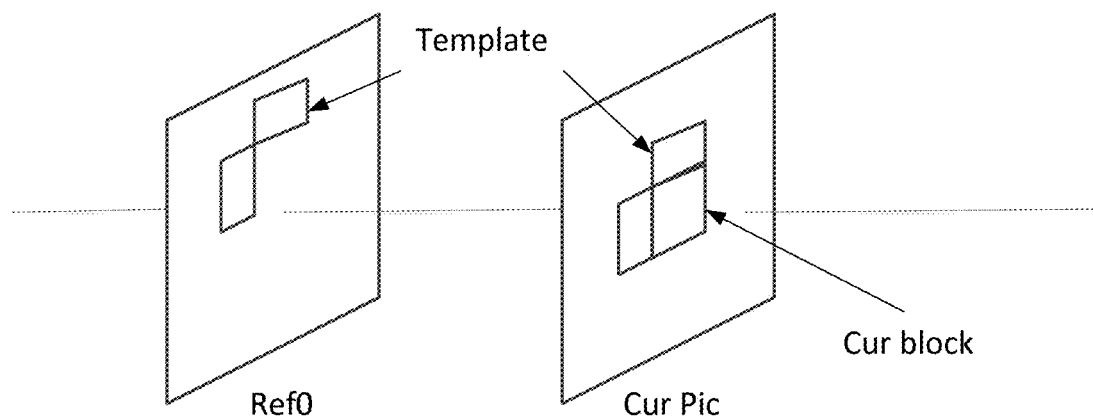
FIG. 20 shows an example of template matching.

As shown in FIG. 20, template matching is used to derive motion information of the current CU by finding the closest match between a template (top and/or left neighbouring blocks of the current CU) in the current picture and a block (same size to the template) in a reference picture. Except the aforementioned FRUC merge mode, the template matching is also applied to AMVP mode. In the JEM, as done in HEVC, AMVP has two candidates. With template matching method, a new candidate is derived. If the newly derived candidate by template matching is different to the first existing AMVP candidate, it is inserted at the very beginning of the AMVP candidate list and then the list size is set to two (meaning remove the second existing AMVP candidate). When applied to AMVP mode, only CU level search is applied.

2.9.1 CU Level MV Candidate Set

The MV candidate set at CU level consists of: 1) original AMVP candidates if the current CU is in AMVP mode; 2) all merge candidates; 3) several MVs in the interpolated MV field, which is introduced in section 0; and 4) top and left neighbouring motion vectors.

When using bilateral matching, each valid MV of a merge candidate is used as an input to generate a MV pair with the assumption of bilateral matching. For example, one valid MV of a merge candidate is (MVa, refa) at reference list A. Then the reference picture refb of its paired bilateral MV is found in the other reference list B so that refa and refb are temporally at different sides of the current picture. If such a refb is not available in reference list B, refb is determined as a reference which is different from refa and its temporal distance to the current picture is the minimal one in list B. After refb is determined, MVb is derived by scaling MVa based on the temporal distance between the current picture and refa, refb.

Four MVs from the interpolated MV field are also added to the CU level candidate list. More specifically, the interpolated MVs at the position (0, 0), (W/2, 0), (0, H/2) and (W/2, H/2) of the current CU are added.

When FRUC is applied in AMVP mode, the original AMVP candidates are also added to CU level MV candidate set.

At the CU level, up to 15 MVs for AMVP CUs and up to 13 MVs for merge CUs are added to the candidate list.

2.9.2 Sub-CU Level MV Candidate Set

The MV candidate set at sub-CU level consists of: 1) an MV determined from a CU-level search; 2) top, left, top-left and top-right neighboring MVs; 3) scaled versions of collocated MVs from reference pictures; 4) up to 4 ATMVP candidates; and 5) up to 4 STMVP candidates.

The scaled MVs from reference pictures are derived as follows. All the reference pictures in both lists are traversed. The MVs at a collocated position of the sub-CU in a reference picture are scaled to the reference of the starting CU-level MV.

ATMVP and STMVP candidates are limited to the four first ones.

At the sub-CU level, up to 17 MVs are added to the candidate list.

2.9.3 Generation of Interpolated MV Field

Before coding a frame, interpolated motion field is generated for the whole picture based on unilateral ME. Then the motion field may be used later as CU level or sub-CU level MV candidates.

Figure 21:
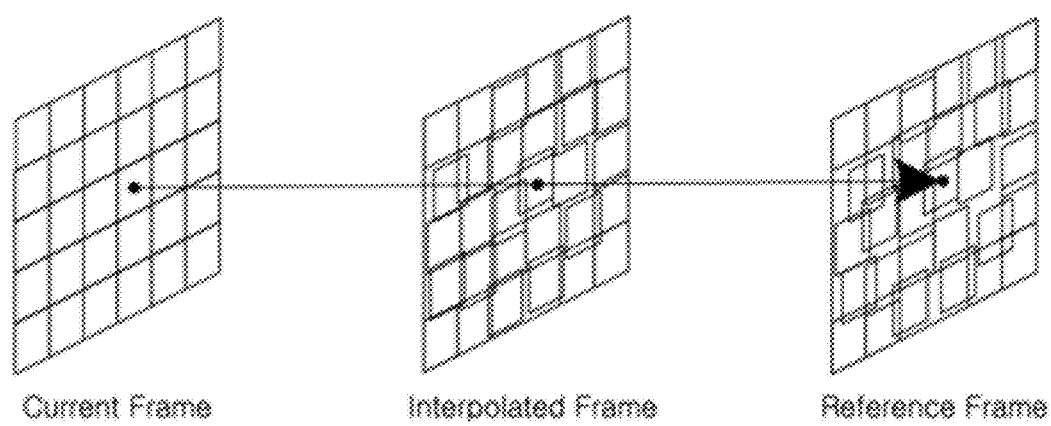
FIG. 21 shows an example of unilateral motion estimation (ME) in frame-rate up conversion (FRUC).

First, the motion field of each reference pictures in both reference lists is traversed at 4×4 block level. For each 4×4 block, if the motion associated to the block passing through a 4×4 block in the current picture (as shown in FIG. 21) and the block has not been assigned any interpolated motion, the motion of the reference block is scaled to the current picture according to the temporal distance TD0 and TD1 (the same way as that of MV scaling of TMVP in HEVC) and the scaled motion is assigned to the block in the current frame. If no scaled MV is assigned to a 4×4 block, the block's motion is marked as unavailable in the interpolated motion field.

2.9.4 Interpolation and Matching Cost

When a motion vector points to a fractional sample position, motion compensated interpolation is needed. To reduce complexity, bi-linear interpolation instead of regular 8-tap HEVC interpolation is used for both bilateral matching and template matching.

The calculation of matching cost is a bit different at different steps. When selecting the candidate from the candidate set at the CU level, the matching cost is the absolute sum difference (SAD) of bilateral matching or template matching. After the starting MV is determined, the matching cost C of bilateral matching at sub-CU level search is calculated as follows:

$$C = SAD + w \cdot (|MV_x - MV_x^s| + |MV_y - MV_y^s|) \qquad (2\text{-}10)$$

where w is a weighting factor which is empirically set to 4, MV and $MV^s$ indicate the current MV and the starting MV, respectively. SAD is still used as the matching cost of template matching at sub-CU level search.

In FRUC mode, MV is derived by using luma samples only. The derived motion will be used for both luma and chroma for MC inter prediction. After MV is decided, final MC is performed using 8-taps interpolation filter for luma and 4-taps interpolation filter for chroma.

2.9.5 MV Refinement

MV refinement is a pattern based MV search with the criterion of bilateral matching cost or template matching cost. In the JEM, two search patterns are supported—an unrestricted center-biased diamond search (UCBDS) and an adaptive cross search for MV refinement at the CU level and sub-CU level, respectively. For both CU and sub-CU level MV refinement, the MV is directly searched at quarter luma sample MV accuracy, and this is followed by one-eighth luma sample MV refinement. The search range of MV refinement for the CU and sub-CU step are set equal to 8 luma samples.

2.9.6 Selection of Prediction Direction in Template Matching FRUC Merge Mode

In the bilateral matching merge mode, bi-prediction is always applied since the motion information of a CU is derived based on the closest match between two blocks along the motion trajectory of the current CU in two different reference pictures. There is no such limitation for the template matching merge mode. In the template matching merge mode, the encoder can choose among uni-prediction from list0, uni-prediction from list1 or bi-prediction for a CU. The selection is based on a template matching cost as follows:

If costBi<=factor*min(cost0, cost1)
   bi-prediction is used;
Otherwise, if cost0<=cost1
   uni-prediction from list0 is used;

Otherwise,
uni-prediction from list1 is used;
where cost0 is the SAD of list0 template matching, cost1 is the SAD of list1 template matching and costBi is the SAD of bi-prediction template matching. The value of factor is equal to 1.25, which means that the selection process is biased toward bi-prediction.

The inter prediction direction selection is only applied to the CU-level template matching process.

Pattern matched motion vector derivation based on template matching is called template matched motion vector derivation.

2.10. Adaptive Motion Vector Resolution (AMVR)

In HEVC, motion vector differences (MVDs) (between the motion vector and predicted motion vector of a CU) are signalled in units of quarter-luma-sample when use_integer_mv_flag is equal to 0 in the slice header. In VVC, a CU-level adaptive motion vector resolution (AMVR) scheme is introduced. AMVR allows MVD of the CU to be coded in different precision. Dependent on the mode (normal AMVP mode or affine AVMP mode) for the current CU, the MVDs of the current CU can be adaptively selected as follows:
Normal AMVP mode: quarter-luma-sample, half-luma-sample, integer-luma-sample or four-luma-sample.
Affine AMVP mode: quarter-luma-sample, integer-luma-sample or 1/16 luma-sample.

The CU-level MVD resolution indication is conditionally signalled if the current CU has at least one non-zero MVD component. If all MVD components (that is, both horizontal and vertical MVDs for reference list L0 and reference list L1) are zero, quarter-luma-sample MVD resolution is inferred.

For a CU that has at least one non-zero MVD component, a first flag is signalled to indicate whether quarter-luma-sample MVD precision is used for the CU. If the first flag is 0, no further signaling is needed and quarter-luma-sample MVD precision is used for the current CU. Otherwise, a second flag is signalled to indicate half-luma-sample or other MVD precisions (interger or four-luma sample) is used for normal AMVP CU. In the case of half-luma-sample, a 6-tap interpolation filter instead of the default 8-tap interpolation filter is used for the half-luma sample position. Otherwise, a third flag is signalled to indicate whether integer-luma-sample or four-luma-sample MVD precision is used for normal AMVP CU. In the case of affine AMVP CU, the second flag is used to indicate whether integer-luma-sample or 1/16 luma-sample MVD precision is used. In order to ensure the reconstructed MV has the intended precision (quarter-luma-sample, half-luma-sample, integer-luma-sample or four-luma-sample), the motion vector predictors for the CU will be rounded to the same precision as that of the MVD before being added together with the MVD. The motion vector predictors are rounded toward zero (that is, a negative motion vector predictor is rounded toward positive infinity and a positive motion vector predictor is rounded toward negative infinity).

The encoder determines the motion vector resolution for the current CU using RD check. To avoid always performing CU-level RD check four times for each MVD resolution, in VTM10, the RD check of MVD precisions other than quarter-luma-sample is only invoked conditionally. For normal AVMP mode, the RD cost of quarter-luma-sample MVD precision and integer-luma sample MV precision is computed first. Then, the RD cost of integer-luma-sample MVD precision is compared to that of quarter-luma-sample MVD precision to decide whether it is necessary to further check the RD cost of four-luma-sample MVD precision. When the RD cost for quarter-luma-sample MVD precision is much smaller than that of the integer-luma-sample MVD precision, the RD check of four-luma-sample MVD precision is skipped. Then, the check of half-luma-sample MVD precision is skipped if the RD cost of integer-luma-sample MVD precision is significantly larger than the best RD cost of previously tested MVD precisions. For affine AMVP mode, if affine inter mode is not selected after checking rate-distortion costs of affine merge/skip mode, merge/skip mode, quarter-luma-sample MVD precision normal AMVP mode and quarter-luma-sample MVD precision affine AMVP mode, then 1/16 luma-sample MV precision and 1-pel MV precision affine inter modes are not checked. Furthermore affine parameters obtained in quarter-luma-sample MV precision affine inter mode is used as starting search point in 1/16 luma-sample and quarter-luma-sample MV precision affine inter modes.

2.11. Decoder Side Motion Vector Refinement (DMVR)

Figure 22:
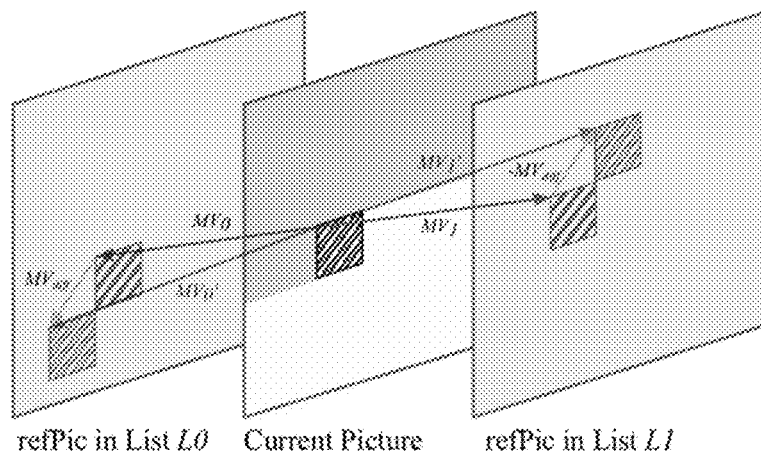
FIG. 22 shows an example of decoding side motion vector refinement.

In order to increase the accuracy of the MVs of the merge mode, a bilateral-matching (BM) based decoder side motion vector refinement is applied in VVC. In bi-prediction operation, a refined MV is searched around the initial MVs in the reference picture list L0 and reference picture list L1. The BM method calculates the distortion between the two candidate blocks in the reference picture list L0 and list L1. As illustrated in FIG. 22, the SAD between the red blocks based on each MV candidate around the initial MV is calculated. The MV candidate with the lowest SAD becomes the refined MV and used to generate the bi-predicted signal.

In VVC, the application of DMVR is restricted and is only applied for the CUs which are coded with following modes and features:
CU level merge mode with bi-prediction MV;
One reference picture is in the past and another reference picture is in the future with respect to the current picture;
The distances (i.e. POC difference) from two reference pictures to the current picture are same;
Both reference pictures are short-term reference pictures;
CU has more than 64 luma samples;
Both CU height and CU width are larger than or equal to 8 luma samples;
BCW weight index indicates equal weight;
WP is not enabled for the current block;
CIIP mode is not used for the current block.

The refined MV derived by DMVR process is used to generate the inter prediction samples and also used in temporal motion vector prediction for future pictures coding. While the original MV is used in deblocking process and also used in spatial motion vector prediction for future CU coding.

The additional features of DMVR are mentioned in the following sub-clauses.

2.11.1 Searching Scheme

In DVMR, the search points are surrounding the initial MV and the MV offset obey the MV difference mirroring rule. In other words, any points that are checked by DMVR, denoted by candidate MV pair (MV0, MV1) obey the following two equations:

$$MV0'=MV0+MV\_offset \qquad (2\text{-}2)$$

$$MV1'=MV1-MV\_offset \qquad (2\text{-}3)$$

where MV_offset represents the refinement offset between the initial MV and the refined MV in one of the reference pictures. The refinement search range is two integer luma samples from the initial MV. The searching includes the integer sample offset search stage and fractional sample refinement stage.

25 points full search is applied for integer sample offset searching. The SAD of the initial MV pair is first calculated. If the SAD of the initial MV pair is smaller than a threshold, the integer sample stage of DMVR is terminated. Otherwise SADs of the remaining 24 points are calculated and checked in raster scanning order. The point with the smallest SAD is selected as the output of integer sample offset searching stage. To reduce the penalty of the uncertainty of DMVR refinement, it is proposed to favor the original MV during the DMVR process. The SAD between the reference blocks referred by the initial MV candidates is decreased by ¼ of the SAD value.

The integer sample search is followed by fractional sample refinement. To save the calculation complexity, the fractional sample refinement is derived by using parametric error surface equation, instead of additional search with SAD comparison. The fractional sample refinement is conditionally invoked based on the output of the integer sample search stage. When the integer sample search stage is terminated with center having the smallest SAD in either the first iteration or the second iteration search, the fractional sample refinement is further applied.

In parametric error surface based sub-pixel offsets estimation, the center position cost and the costs at four neighboring positions from the center are used to fit a 2-D parabolic error surface equation of the following form:

$$E(x,y)=A(x-x_{min})^2+B(y-y_{min})^2+C \quad (2\text{-}13)$$

where $(x_{min}, y_{min})$ corresponds to the fractional position with the least cost and C corresponds to the minimum cost value. By solving the above equations by using the cost value of the five search points, the $(x_{min}, y_{min})$ is computed as:

$$x_{min}=(E(-1,0)-E(1,0))/(2(E(-1,0)+E(1,0)-2E(0,0))) \quad (2\text{-}14)$$

$$y_{min}=(E(0,-1)-E(0,1))/(2((E(0,-1)+E(0,1)-2E(0,0))) \quad (2\text{-}15)$$

The value of $x_{min}$ and $y_{min}$ are automatically constrained to be between −8 and 8 since all cost values are positive and the smallest value is E(0,0). This corresponds to half peal offset with 1/16th-pel MV accuracy in VVC. The computed fractional $(x_{min}, y_{min})$ are added to the integer distance refinement MV to get the sub-pixel accurate refinement delta MV.

2.11.2 Bilinear-Interpolation and Sample Padding

In VVC, the resolution of the MVs is 1/16 luma samples. The samples at the fractional position are interpolated using a 8-tap interpolation filter. In DMVR, the search points are surrounding the initial fractional-pel MV with integer sample offset, therefore the samples of those fractional position need to be interpolated for DMVR search process. To reduce the calculation complexity, the bi-linear interpolation filter is used to generate the fractional samples for the searching process in DMVR. Another important effect is that by using bi-linear filter is that with 2-sample search range, the DVMR does not access more reference samples compared to the normal motion compensation process. After the refined MV is attained with DMVR search process, the normal 8-tap interpolation filter is applied to generate the final prediction. In order to not access more reference samples to normal MC process, the samples, which is not needed for the interpolation process based on the original MV but is needed for the interpolation process based on the refined MV, will be padded from those available samples.

2.11.3 Maximum DMVR Processing Unit

When the width and/or height of a CU are larger than 16 luma samples, it will be further split into sub-blocks with width and/or height equal to 16 luma samples. The maximum unit size for DMVR searching process is limit to 16×16.

3. Problems

The current design of template matched motion vector derivation can be further improved to provide a better tradeoff between coding performance and complexity.

4. Invention

The detailed inventions below should be considered as examples to explain general concepts. These inventions should not be interpreted in a narrow way. Furthermore, these inventions can be combined in any manner.

Figure 23A:
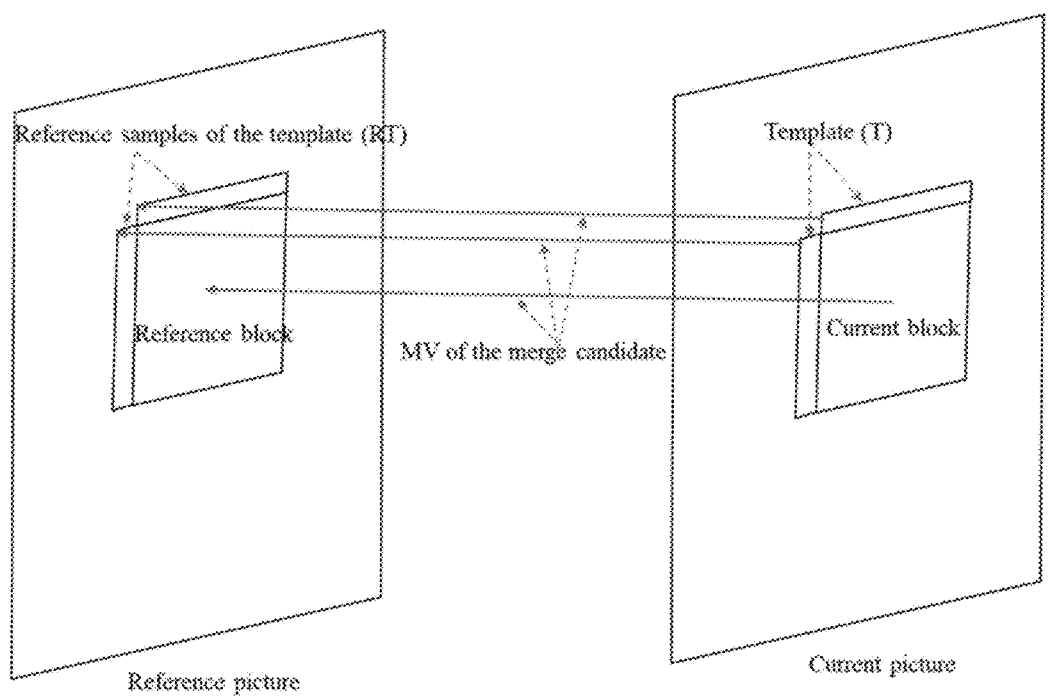
FIG. 23A shows an example template and example reference samples of the template, in accordance with some embodiments of the present disclosure.
Figure 23B:
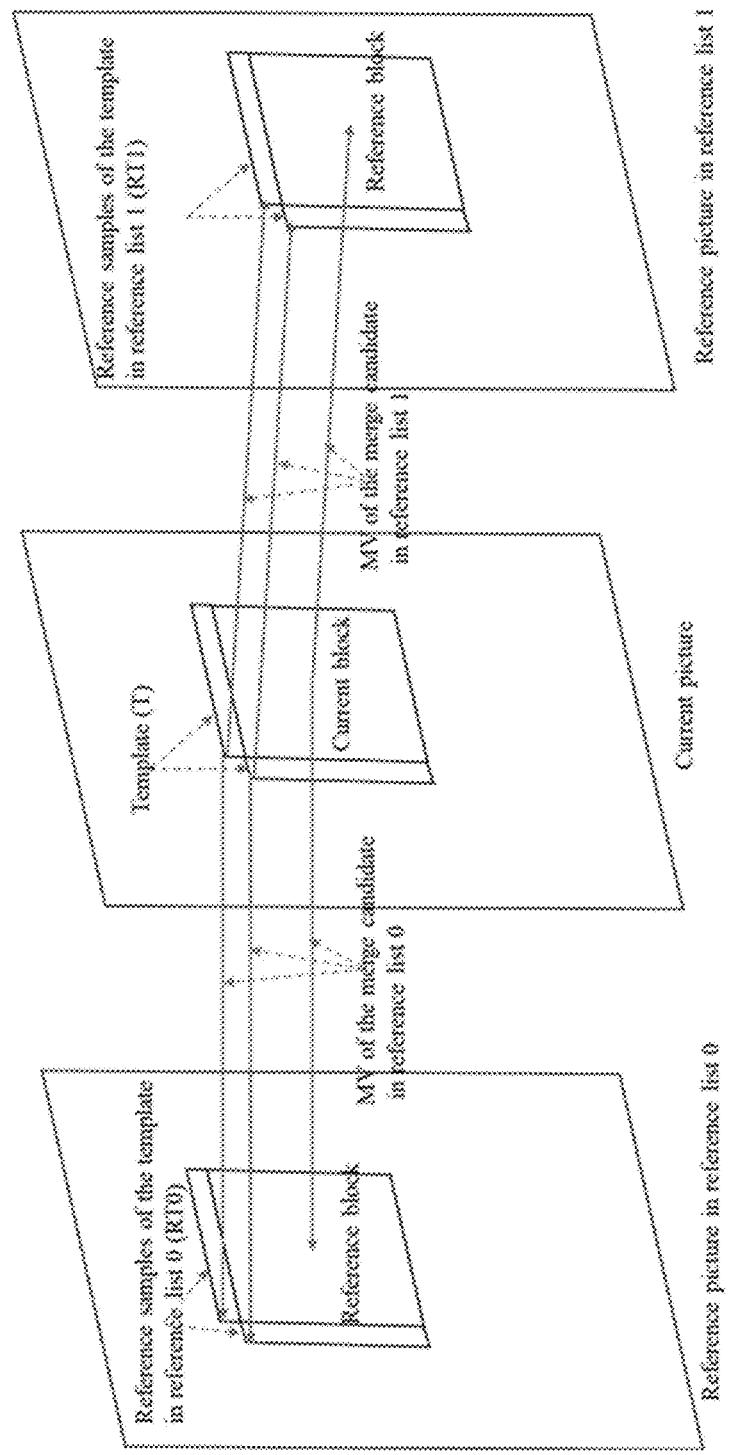
FIG. 23B shows an example template and example reference samples of the template in two reference picture lists, in accordance with some embodiments of the present disclosure.

Hereinafter, template is a set of reconstructed samples adjacently or non-adjacently neighboring to the current block. Reference samples of the template are derived according to the same motion information of the current block. For example, reference samples of the template are mapping of the template depend on a motion information. In this case, reference samples of the template are located by a motion vector of the motion information in a reference picture indicated by the reference index of the motion information. FIG. 23A shows an example template and example reference samples of the template, in accordance with some embodiments of the present disclosure, wherein RT represents the reference samples of the template T. In addition, FIG. 23B shows an example template and example reference samples of the template in two reference picture lists, in accordance with some embodiments of the present disclosure shows an example, wherein RT1 represents the reference samples of the template T in reference list 1 and RT2 represents the reference samples of the template T in reference list 2.

Template matched motion vector derivation is also referred to as template matched decoder side motion vector derivation (TM-DMVD).

For template DMVD merge mode, the motion derivation process is performed for each reference picture list, respectively.

Then template DMVD mode may be applied to a block, such as a CU or a PU, or a sub-CU (sub-block). W and H are the width and height of current block (e.g., luma block).

1. Motion derivation process in template DMVD AMVP mode has two steps. First, the Motion candidate set is generated and the candidate which leads to the minimum matching cost is selected as the starting point for further block level refinement. Then a local search based on template matching around the starting point is performed and the MV resulting in the minimum matching cost is taken as the TM-DMVD Motion candidate for the whole block.
2. Alternatively, motion derivation process in template DMVD AMVP mode has two steps. First, the Motion candidate set is generated. Then a local search based on template matching around each Motion candidate is performed and the MV resulting in the minimum matching cost is taken as the refined Motion candidate and the refined Motion candidate which leads to the minimum matching cost is selected as the TM-DMVD Motion candidate for the whole block.

3. Motion derivation process in template DMVD merge mode has two steps. First, the Motion candidate set is generated and the candidate which leads to the minimum matching cost is selected as the starting point for further block level refinement. Then a local search based on template matching around the starting point is performed and the MV resulting in the minimum matching cost is taken as the TM-DMVD Motion candidate for the whole block. For template DMVD merge mode, the motion derivation process is performed for each reference picture list, respectively.

a. In the template matching merge mode can choose among uni-prediction from list0, uni-prediction from list1 or bi-prediction for a block.

i. The selection is based on the template matching cost.

4. Alternatively, motion derivation process in template DMVD merge mode has two steps. First, the Motion candidate set is generated. Then a local search based on template matching around each Motion candidate is performed for each reference picture list and the MV resulting in the minimum matching cost is taken as the refined Motion candidate and the refined Motion candidate which leads to the minimum matching cost is selected as the TM-DMVD Motion candidate for the whole block.

a. In one example, when selecting the refined motion candidate which leads to the minimum matching cost, if uni-prediction (i.e. reference list LX, X is 0 or 1) is used for one motion candidate, minimum matching cost of reference list LX is used; if bi-prediction is used for one motion candidate, the average of minimum matching cost of reference list L0 and reference list L1 is used.

b. Alternatively, if bi-prediction is used for one motion candidate, matching cost between current template and the reference samples of the template is used. The reference samples of the template of the motion candidate are denoted by RT and RT may be generated from $RT_0$ which are derived from a reference picture in reference picture list 0 and $RT_1$ derived from a reference picture in reference picture list 1. An example is shown in FIG. 23B.

i. In one example, the reference samples of the template (RT) for bi-directional prediction are derived by weighted averaging of the reference samples of the template in reference list0 ($RT_0$) and the reference samples of the template in reference list1 ($RT_1$).

(i) One example is as follows:

$$RT=(RT_0+RT_1+1)>>1$$

5. Alternatively, motion derivation process in template DMVD merge mode has two steps. First, the Motion candidate set is generated. Then a local search based on template matching around each Motion candidate is performed for each reference picture list and the MV resulting in the minimum matching cost is taken as the refined Motion candidate and the refined Motion candidate which leads to the minimum RDO cost is selected as the TM-DMVD Motion candidate for the whole block. In this way, an index is needed to signal to the decoder.

6. The Motion candidate set of a block for template matched motion vector derivation may consist of the motion vector predictors derived from the neighboring blocks.

a. In one example, the Motion candidate set may consist of original AMVP candidates followed by all merge candidates if the current block is a CU in AMVP mode.

b. In one example, the Motion candidate set may consist of all merge candidates if the current block is a CU in merge mode.

c. In one example, the Motion candidate set may consist of partial original AMVP candidates followed by partial merge candidates if the current block is a CU in AMVP mode.

d. In one example, the Motion candidate set may consist of partial merge candidates if the current block is a CU in merge mode.

e. In one example, the Motion candidate set may consist of original AMVP candidates if the current block is a CU in AMVP mode.

f. In one example, when deriving the Motion candidate from a merge candidate if the current block is a CU in AMVP mode, the reference index and reference picture list of the merge candidate in one prediction direction are both same as current reference index and current reference picture list of current AMVP mode, the prediction motion information (e.g., motion vector and reference index) in this prediction direction may be inserted into the Motion candidate set.

g. In one example, when deriving the Motion candidate from a merge candidate if the current block is a CU in AMVP mode, the reference picture of the merge candidate in one prediction direction is same as current reference picture of current AMVP mode, the prediction motion information (e.g., motion vector and reference index) in this prediction direction may be inserted into the Motion candidate set.

h. In one example, when deriving the Motion candidate from a merge candidate if the current block is a CU in merge mode, the prediction motion information (e.g., motion vector and reference index) in one prediction direction may be inserted into the Motion candidate set corresponding to the prediction direction. In this way, two Motion candidate sets are derived. Each reference picture list has a Motion candidate set.

i. In one example, when deriving the Motion candidate from a merge candidate if the current block is a CU in merge mode, the prediction motion information (e.g., motion vector and reference index) in each prediction direction may be inserted into the Motion candidate set correspondingly. In this way, only one Motion candidate set is derived. Each Motion candidate includes the motion information of both two reference picture lists.

j. In one example, when deriving the Motion candidate from a merge candidate, only the block level merge candidate (not SbTMVP) can be used.

7. The Motion candidate derived by template matching for AMVP mode may be reused for different MV resolutions.

a. In one example, to reduce the encoding complexity, when AMVR is enabled, the derived candidate in a first MV precision (e.g. quarter-luma-sample) may be reused in a second MV precision (such as half-luma-sample, integer-luma-sample and four-luma-sample).

8. The number of AMVP candidates may depend on whether TM-DMVD is applied.

a. In one example, the number of AMVP candidates may be set to be a first number such as 1 when TM-DMVD is applied, but it is set to be a second number such as 2 when TM-DMVD is not applied.

i. In one example, if the Motion candidate derived by template matching is available, it is used as the AMVP candidate. Otherwise, the AMVP candidate derived from neighboring blocks (such as in VVC) is used.

9. The searching order for MV refinement of template matched motion vector derivation may depend on coding information such as coding mode.
   a. In one example, whether to do MV refinement in TM-DMVD with a specific MV resolution and/or the searching order of MV refinement in TM-DMVD with different MV resolutions may depend on coding information such as coding mode.
      i. In one example, if the coding mode is template matched motion vector derivation merge mode, the searching order is integer→quarter→one-sixteenth sample offset searching.
      ii. In one example, if the coding mode is template matched motion vector derivation AMVP mode, the searching order is integer→quarter→one-sixteenth sample offset searching.
      iii. In one example, if the coding mode is template matched motion vector derivation merge mode, the searching order is integer→quarter sample offset searching.
      iv. In one example, if the coding mode is template matched motion vector derivation AMVP mode, the searching order is integer→quarter sample offset searching.
      v. In one example, if the coding mode is template matched motion vector derivation merge mode, the searching order is integer→half→quarter→one-sixteenth sample offset searching.
      vi. In one example, if the coding mode is template matched motion vector derivation merge mode, the searching order is integer→half→quarter→one-eighth→one-sixteenth sample offset searching.
      vii. In one example, if the coding mode is template matched motion vector derivation merge mode, the searching order is integer→half→quarter sample offset searching.
      viii. In one example, if the coding mode is template matched motion vector derivation AMVP mode, the searching order is integer→half→quarter sample offset searching.

Figure 24A:
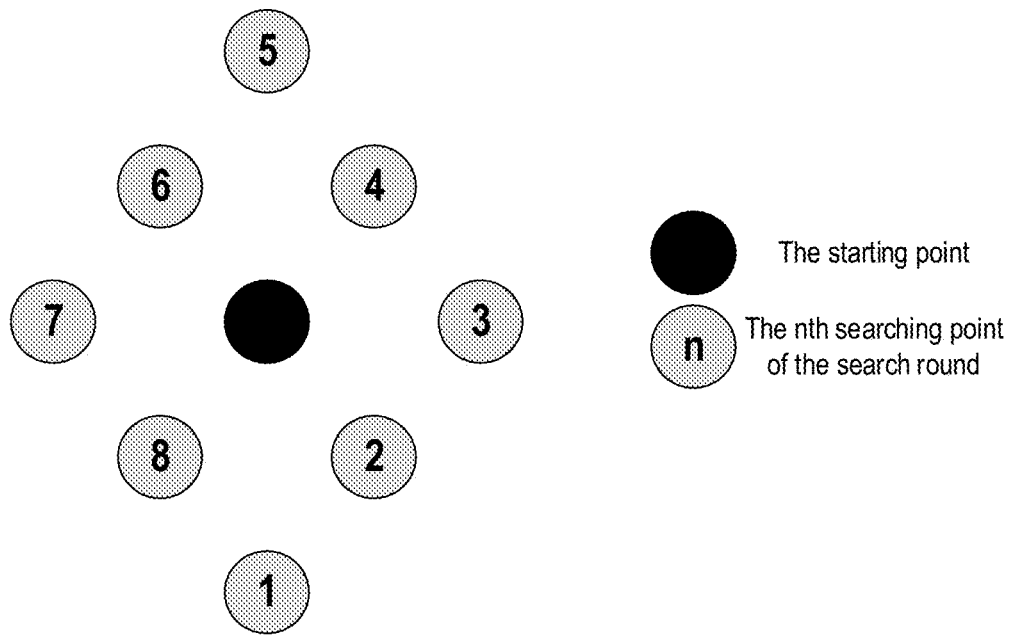
FIG. 24A shows an example search patterns in accordance with some embodiments of the present disclosure.
Figure 24B:
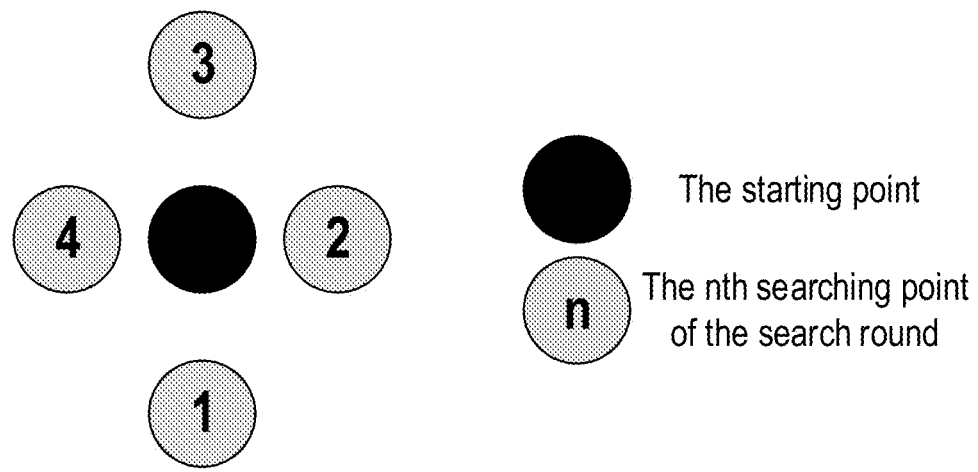
FIG. 24B shows another example search patterns in accordance with some embodiments of the present disclosure.
Figure 25:
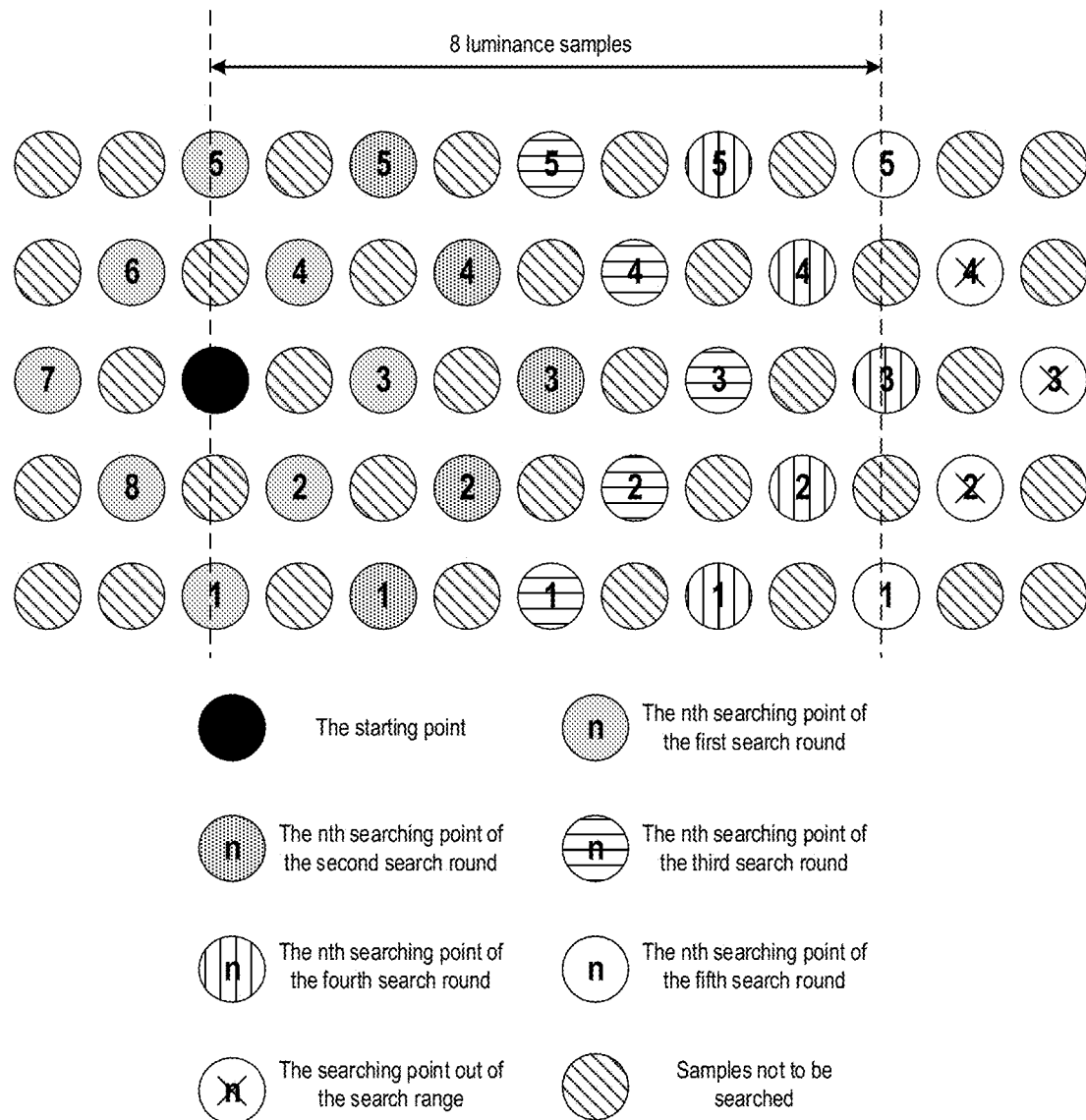
FIG. 25 shows an example unrestricted center-biased diamond search (UCBDS) pattern with a search range of 8 luminance samples in accordance with some embodiments of the present disclosure.

10. The searching procedure for MV refinement may follow different rules for different searching MV resolutions.
    a. In one example, for integer sample offset searching, the searching procedure will be terminated in case the center searching point has the minimum matching cost among all points of the UCBDS search pattern as shown in FIG. 24A. And then one search round is performed with a cross search pattern (i.e. four searching points around the center position as shown in FIG. 24B). In a search round, the searching point with the minimum matching cost is selected as the starting point for further fractional sample offset searching if there is fractional sample offset searching or the final best matching position if there is only integer sample offset searching.
    b. In one example, for half, quarter, one-eighth and one-sixteenth sample offset searching, only one search round is performed with a cross search pattern as shown in FIG. 24B.
    c. The MV refinement for a block is constrained to a search range.
       i. The search range may be set to 8 luma samples as shown in FIG. 25.

11. The fractional sample offset may be derived with the parametric error surface based sub-pixel offsets estimation method as in DMVR.
    a. In one example, after the integer sample offset is determined, to save the calculational complexity, the fractional sample offset is derived by using parametric error surface equation, instead of additional search with SAD comparison.
       i. In one example, the fractional sample refinement is conditionally invoked based on the output of the integer sample search stage. When the integer sample search stage is terminated with center having the minimum matching cost, the fractional sample refinement is further applied.
       In parametric error surface based sub-pixel offsets estimation, the center position
       cost and the costs at four neighboring positions from the center are used to fit a
       2-D parabolic error surface equation of the following form $$E(x,y)=A(x-x_{min})^2-B(y-y_{min})^2+C$$

where $(x_{min}, y_{min})$ corresponds to the fractional position with the least cost and
       C corresponds to the minimum cost value. By solving the above equations by using
       the cost value of the five search points, the $(x_{min}, y_{min})$ is computed as:

$$x_{min}=(E(-1,0)-E(1,0))/(2(E(-1,0)+E(1,0)-2E(0,0)))$$

$$y_{min}=(E(0,-1)-E(0,1))/(2(E(0,-1)+E(0,1)-2E(0,0)))$$

The value of $x_{min}$ and $y_{min}$ are automatically constrained to be between −8 and 8
       since all cost values are positive and the smallest value is E(0,0). This corresponds
       to half pixel offset with 1/16th-pel MV accuracy in VVC. The computed fractional
       $(x_{min}, y_{min})$ are added to the integer distance refinement MV to get the sub-pixel
       accuracy refinement delta MV.

Figure 26:
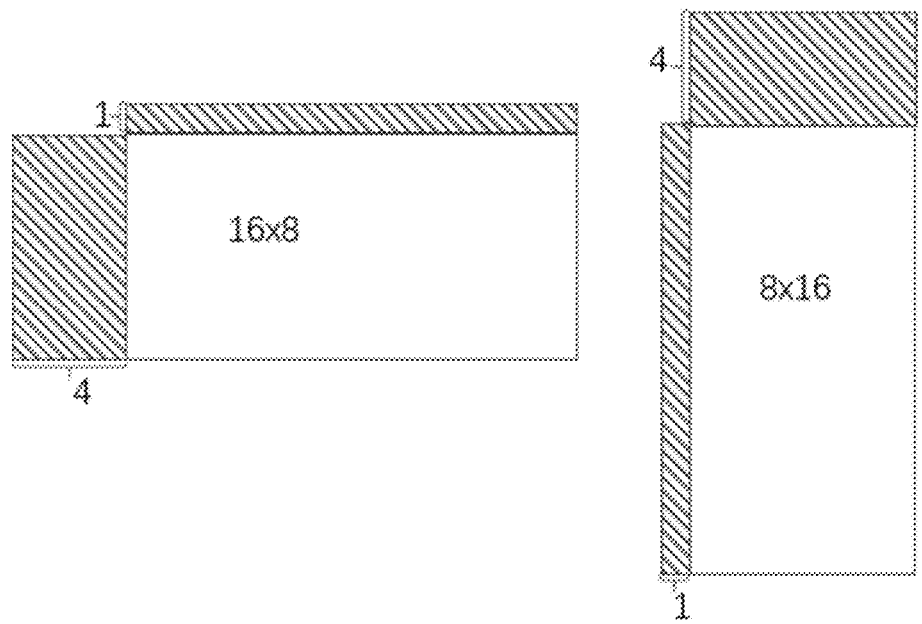
FIG. 26 shows an adaptive template size in accordance with some embodiments of the present disclosure.
Figure 27:
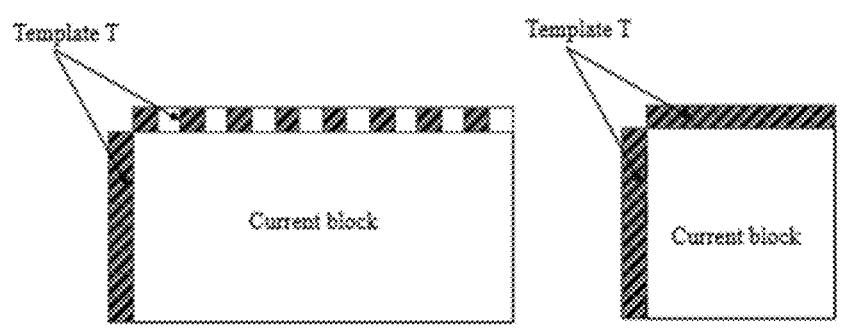
FIG. 27 shows an example of no subsampling for the short side template in accordance with some embodiments of the present disclosure.

12. The template shape for TM-DMVD can be adaptive.
    a. The template shape may depend on coding information such as block dimensions, coding mode and neighboring information.
    b. The template shape may be signaled from encoder to decoder.
    c. In one example, the template may only comprise neighboring samples left to the current block.
    d. In one example, the template may only comprise neighboring samples above to the current block.
    e. In one example, the template shape is selected according to the CU shape.
    f. In one example, the width of the left template is selected according to the CU height.
       i. For example, if H<=M, then the left template size is w1×H; otherwise, the left template size is w2×H.
          (i) In one example, M, w1, and w2 are set equal to 8, 1, and 2, respectively.
          (ii) In one example, M, w1, and w2 are set equal to 8, 1, and 4, respectively.
    g. In one example, the height of the above template is selected according to the CU width.
       i. For example, if W<=N, then the above template size is W×h1; otherwise, the above template size is W×h2.
          (i) In one example, N, h1, and h2 are set equal to 8, 1, and 2, respectively.
          (ii) In one example, N, h1, and h2 are set equal to 8, 1, and 4, respectively.

h. In one example, the width of the left template is selected according to the CU width.
  i. For example, if W<=N, then the left template size is w1×H; otherwise, the left template size is w2×H.
    (i) In one example, N, w1, and w2 are set equal to 8, 1, and 2, respectively.
    (ii) In one example, N, w1, and w2 are set equal to 8, 1, and 4, respectively, as shown in FIG. 26.
  i. In one example, the height of the above template is selected according to the CU height.
    i. For example, if H<=M, then the above template size is W×h1; otherwise, the above template size is W×h2.
      (i) In one example, M, h1, and h2 are set equal to 8, 1, and 2, respectively.
      (ii) In one example, M, h1, and h2 are set equal to 8, 1, and 4, respectively (as shown in FIG. 26).
  j. In one example, samples of the template and the reference samples of the template samples may be sub-sampled or down-sampled before being used to calculate the cost.
    i. Whether to and/or how to do subsampling may depend on the CU dimensions.
    ii. In one example, no subsampling is performed for the short side of the CU as shown in FIG. 27.
13. The cost may be calculated based on the sum of absolute differences (SAD) of T and RT.
  a. Alternatively, the cost may be calculated based on the sum of absolute transformed differences (SATD) of T and RT.
  b. Alternatively, the cost may be calculated based on the sum of squared differences (SSD) of T and RT.
  c. Alternatively, the cost may be calculated based on weighted SAD/weighted SATD/weighted SSD.
  d. The cost may consider the continuity (Boundary_SAD) between RT and reconstructed samples adjacently or non-adjacently neighboring to T in addition to the SAD calculated. For example, reconstructed samples left and/or above adjacently or non-adjacently neighboring to T are considered.
    i. In one example, the cost may be calculated based on SAD and Boundary_SAD
      (i) In one example, the cost may be calculated as (SAD+w*Boundary_SAD). w may be pre-defined, or signaled or derived according to decoded information.
14. Only CU-level template matched motion vector derivation is performed.
15. TM-DMVD may be applied to the luma component only.
  a. TM-DMVD may be applied to other components, such as Cb, Cr, or B, G, R.
  b. For different components, TM-DMVD may be applied with different rules, such as with different template shapes or different searching rules.
16. Whether and/or how to apply TM-DMVD may be signaled at sequence level or picture level or slice level or sub-picture level or CTU level or CU level, such as in SPS/PPS/Picture header/slice header/or CTU/or CU.
  a. In one example, the template DMVD merge mode is signaled using a CU-level flag as one kind of merge mode, with other merge modes including the common merge mode, the MMVD mode, the CIIP mode, the GPM mode and the subblock merge mode.
    i. In one example, it is treated as a non-regular merge mode similar as CIIP and GPM mode. The template DMVD mode flag is coded after CIIP mode flag.
    ii. In one example, it is treated as a non-regular merge mode similar as CIIP and GPM mode. The template DMVD mode flag is coded before CIIP mode flag.
    iii. In one example, it is treated as a regular merge mode similar as common merge and MMVD mode. The template DMVD mode flag is coded after MMVD mode flag.
    iv. In one example, it is treated as a regular merge mode similar as common merge and MMVD mode. The template DMVD mode flag is coded before MMVD mode flag.

5. Embodiment 5.1. Embodiment #1

Template matched decoder side motion vector derivation (DMVD) is based on template matching. With this mode, motion information of a block is not signalled but derived at decoder side. It can be used for both merge and AMVP mode.

The template DMVD merge mode is signalled using a CU-level flag as one kind of merge mode, with other merge modes including the regular merge mode, the MMVD mode, the CIIP mode, the GPM mode and the subblock merge mode. It is treated as a non-regular merge mode similar as CIIP and GPM mode. The template DMVD mode flag is coded after CIIP mode flag.

The template DMVD merge mode can be applied for CUs with both width and height larger than or equal to 8.

Motion derivation process in template DMVD mode has two steps. First, a list of Motion candidates is generated and the candidate which leads to the minimum matching cost is selected as the starting point for further CU level refinement. Then a local search based on template matching around the starting point is performed and the MV resulting in the minimum matching cost is taken as the MV for the whole CU. For template DMVD merge mode, the motion derivation process is performed for each reference picture list, respectively.

As shown in FIG. 23A, template matching is used to derive motion information of the current CU by finding the closest match between a template (top and/or left neighbouring blocks of the current CU) in the current picture and a block (same size to the template) in a reference picture.

Except the aforementioned template DMVD merge mode, the template matching is also applied to AMVP mode. In the VVC, as done in HEVC, AMVP has two candidates. With template matching method, a new candidate is derived. AMVP has only one candidate. If the newly derived DMVD candidate by template matching is available, it is used as the AMVP candidate. Otherwise, the first existing AMVP candidate is used. To reduce the encoding complexity, when AMVR is enabled, the derived DMVD candidate in quarter-luma-sample MVD precision is reused in half-luma-sample, integer-luma-sample and four-luma-sample MVD precisions.

5.1.1 CU Level Motion Candidate Set

The Motion candidate set at CU level consists of: 1) original AMVP candidates if the current CU is in AMVP mode; and 2) all merge candidates.

When template DMVD is applied in AMVP mode, the original AMVP candidates are also added to CU level Motion candidate set.

5.1.2 Interpolation and Matching Cost

When a motion vector points to a fractional sample position, motion compensated interpolation is needed. To reduce complexity, bi-linear interpolation instead of regular 8-tap interpolation is used for template matching.

When selecting the candidate from the candidate set and local searching for template DMVD merge, the matching cost is the absolute sum difference (SAD) of template matching.

When deriving the DMVD candidate for AMVP, SAD is still used as the matching cost of template matching when selecting the candidate from the candidate set. However, after the starting MV is determined, the matching cost C of local search is calculated as follows:

$$C = SAD + w \cdot (|MV_x - MV_x^s| + |MV_y^s|)$$

where w is a weighting factor which is empirically set to 4, MV and $MV^s$ indicate the current MV and the starting MV, respectively.

In template DMVD mode, MV is derived by using luma samples only. The derived motion will be used for both luma and chroma for MC inter prediction. After MV is decided, final MC is performed using 8-taps interpolation filter for luma and 4-taps interpolation filter for chroma.

5.1.3 MV Refinement

MV refinement is a pattern based MV search with the criterion of template matching cost. Two search patterns are supported—an unrestricted center-biased diamond search (UCBDS) and an adaptive cross search for MV refinement at the CU level. The search range of MV refinement is set equal to 8 luma samples.

The search order for template DMVD merge is integer→quarter→one-sixteenth sample offset searching The search order for template DMVD AMVP is integer→quarter sample offset searching For integer sample offset searching, MAX_UINT search rounds will be used until the center searching point has the minimum matching cost for UCBDS search pattern as shown in FIG. 24A. And then one search round is used for cross search pattern as shown in FIG. 24B.

For quarter and one-sixteenth sample offset searching, only one search round is used for cross search pattern as shown in FIG. 24B.

5.1.4 Selection of Prediction Direction in Template Matching DMVD Merge Mode In the template matching merge mode, the encoder can choose among uni-prediction from list0, uni-prediction from list1 or bi-prediction for a CU. The selection is based on a template matching cost as follows:
If costBi<=factor*min (cost0, cost1)
   bi-prediction is used;
Otherwise, if cost0<=cost1
   uni-prediction from list0 is used;
Otherwise,
   uni-prediction from list1 is used;
where cost0 is the SAD of list0 template matching, cost1 is the SAD of list1 template matching and costBi is the SAD of bi-prediction template matching. The value of factor is equal to 1.25, which means that the selection process is biased toward bi-prediction.

5.1.5 Template Size

An adaptive template size is used. Assume the size of the current block is W×H. For the above template samples, if H<=8, then the above template size is W×1; otherwise, the above template size is W×4. Similarly, for the template samples to the left of the block, if W<=8, then the left template size is 1×H; otherwise, the left template size is 4×H.

Figure 28:
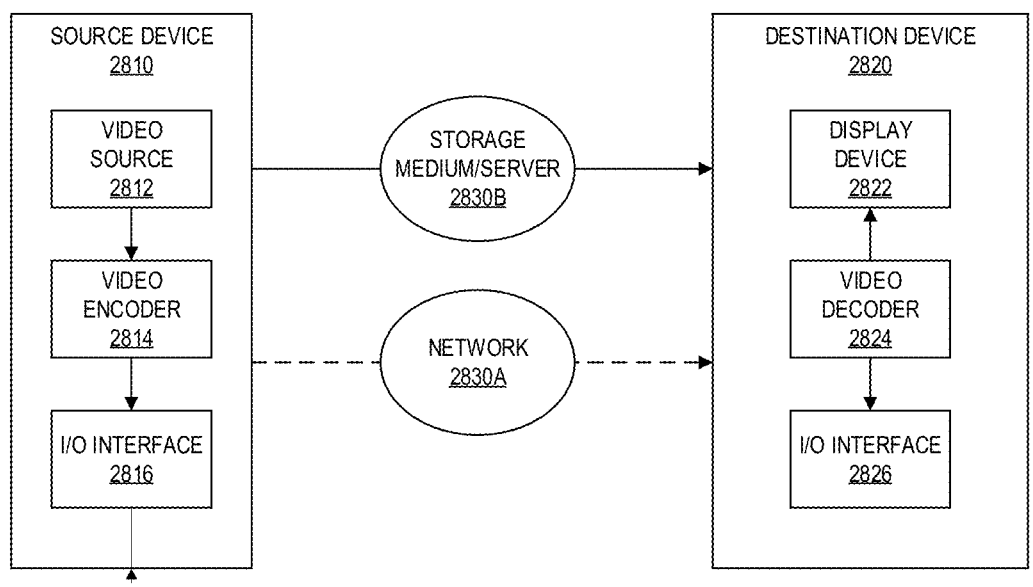
FIG. 28 is a block diagram that illustrates an example video coding system, in accordance with some embodiments of the present disclosure.

FIG. 28 is a block diagram that illustrates an example video coding system 2800 that may utilize the techniques of this disclosure. As shown, the video coding system 2800 may include a source device 2810 and a destination device 2820. The source device 2810 can be also referred to as a video encoding device, and the destination device 2820 can be also referred to as a video decoding device. In operation, the source device 2810 can be configured to generate encoded video data and the destination device 2820 can be configured to decode the encoded video data generated by the source device 2810. The source device 2810 may include a video source 2812, a video encoder 2814, and an input/output (I/O) interface 2816.

The video source 2812 may include a source such as a video capture device. Examples of the video capture device include, but are not limited to, an interface to receive video data from a video content provider, a computer graphics system for generating video data, and/or a combination thereof.

The video data may comprise one or more pictures. The video encoder 2814 encodes the video data from the video source 2812 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. The I/O interface 2816 may include a modulator/demodulator and/or a transmitter. The encoded video data may be transmitted directly to destination device 2820 via the I/O interface 2816 through the network 2830a. The encoded video data may also be stored onto a storage medium/server 2830b for access by destination device 2820.

The destination device 2820 may include an I/O interface 2826, a video decoder 2824, and a display device 2822. The I/O interface 2826 may include a receiver and/or a modem. The I/O interface 2826 may acquire encoded video data from the source device 2810 or the storage medium/server 2830b. The video decoder 2824 may decode the encoded video data. The display device 2822 may display the decoded video data to a user. The display device 2822 may be integrated with the destination device 2820, or may be external to the destination device 2820 which be configured to interface with an external display device.

The video encoder 2814 and the video decoder 2824 may operate according to a video compression standard, such as the High Efficiency Video Coding (HEVC) standard, Versatile Video Coding (VVC) standard and other current and/or further standards.

Figure 29:
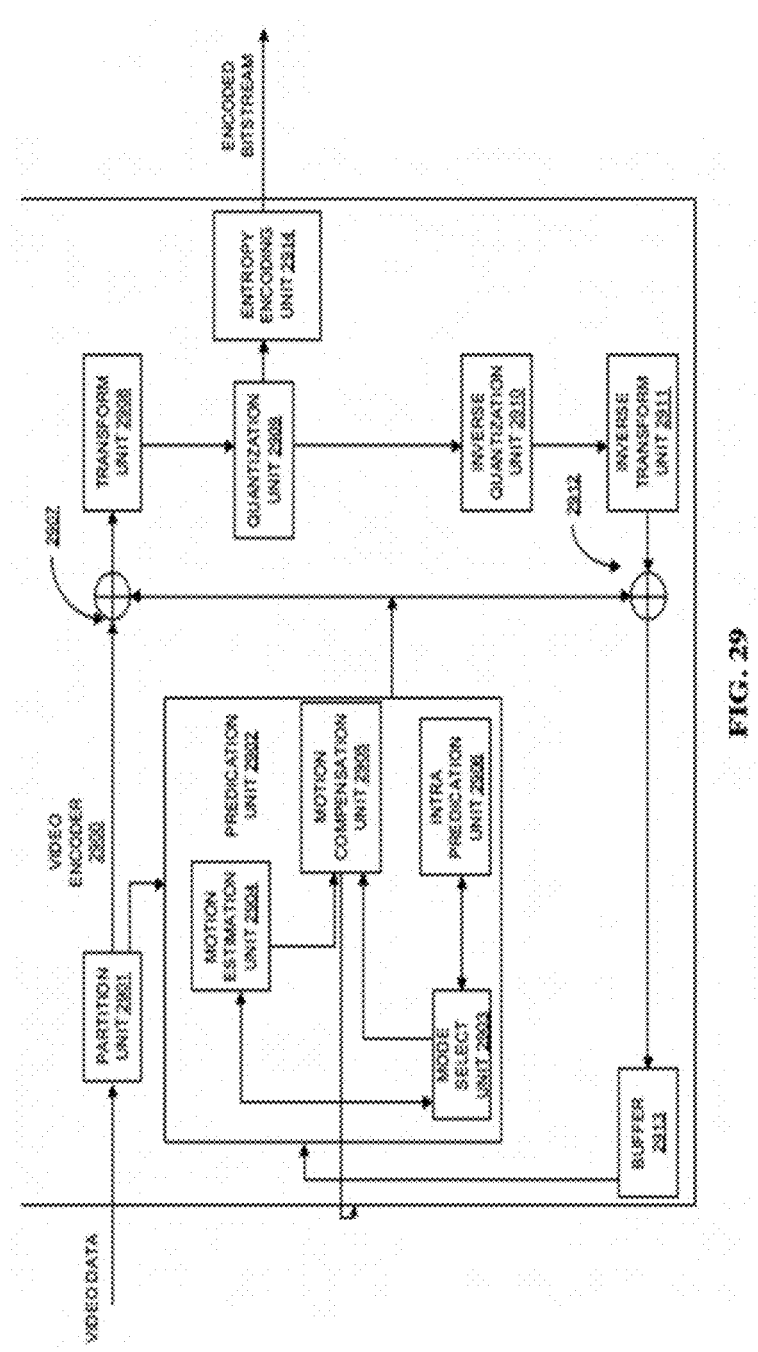
FIG. 29 is a block diagram that illustrates an example video encoder, in accordance with some embodiments of the present disclosure.

FIG. 29 is a block diagram illustrating an example of video encoder 2900, which may be an example of the video encoder 2814 in the system 2800 illustrated in FIG. 28, in accordance with some aspects of the present disclosure.

The video encoder 2900 may be configured to implement any or all of the techniques of this disclosure. In the example of FIG. 29, the video encoder 2900 includes a plurality of functional components. The techniques described in this disclosure may be shared among the various components of the video encoder 2900. In some examples, a processor may be configured to perform any or all of the techniques described in this disclosure.

In some embodiments, the video encoder 2900 may include a partition unit 2901, a predication unit 2902 which may include a mode select unit 2903, a motion estimation unit 2904, a motion compensation unit 2905 and an intra-prediction unit 2906, a residual generation unit 2907, a transform unit 2908, a quantization unit 2909, an inverse quantization unit 2910, an inverse transform unit 2911, a reconstruction unit 2912, a buffer 2913, and an entropy encoding unit 2914.

In other examples, the video encoder 2900 may include more, fewer, or different functional components. In an example, the predication unit 2902 may include an intra block copy (IBC) unit. The IBC unit may perform predication in an IBC mode in which at least one reference picture is a picture where the current video block is located.

Furthermore, although some components, such as the motion estimation unit 2904 and the motion compensation unit 2905, may be integrated, but are represented in the example of FIG. 29 separately for purposes of explanation.

The partition unit 2901 may partition a picture into one or more video blocks. The video encoder 2900 and the video decoder 3000 may support various video block sizes.

The mode select unit 2903 may select one of the coding modes, intra or inter, e.g., based on error results, and provide the resulting intra-coded or inter-coded block to a residual generation unit 2907 to generate residual block data and to a reconstruction unit 2912 to reconstruct the encoded block for use as a reference picture. In some example, the mode select unit 2903 may select a combination of intra and inter predication (CIIP) mode in which the predication is based on an inter predication signal and an intra predication signal. The mode select unit 2903 may also select a resolution for a motion vector (e.g., a sub-pixel or integer pixel precision) for the block in the case of inter-predication.

To perform inter prediction on a current video block, the motion estimation unit 2904 may generate motion information for the current video block by comparing one or more reference frames from buffer 2913 to the current video block. The motion compensation unit 2905 may determine a predicted video block for the current video block based on the motion information and decoded samples of pictures from the buffer 2913 other than the picture associated with the current video block.

The motion estimation unit 2904 and the motion compensation unit 2905 may perform different operations for a current video block, for example, depending on whether the current video block is in an I-slice, a P-slice, or a B-slice. As used herein, an "I-slice" may refer to a portion of a picture composed of macroblocks, all of which are based upon macroblocks within the same picture. Further, as used herein, in some aspects, "P-slices" and "B-slices" may refer to portions of a picture composed of macroblocks that are not dependent on macroblocks in the same picture.

In some examples, the motion estimation unit 2904 may perform uni-directional prediction for the current video block, and the motion estimation unit 2904 may search reference pictures of list 0 or list 1 for a reference video block for the current video block. The motion estimation unit 2904 may then generate a reference index that indicates the reference picture in list 0 or list 1 that contains the reference video block and a motion vector that indicates a spatial displacement between the current video block and the reference video block. The motion estimation unit 2904 may output the reference index, a prediction direction indicator, and the motion vector as the motion information of the current video block. The motion compensation unit 2905 may generate the predicted video block of the current video block based on the reference video block indicated by the motion information of the current video block.

Alternatively, in other examples, the motion estimation unit 2904 may perform bi-directional prediction for the current video block. The motion estimation unit 2904 may search the reference pictures in list 0 for a reference video block for the current video block and may also search the reference pictures in list 1 for another reference video block for the current video block. The motion estimation unit 2904 may then generate reference indexes that indicate the reference pictures in list 0 and list 1 containing the reference video blocks and motion vectors that indicate spatial displacements between the reference video blocks and the current video block. The motion estimation unit 2904 may output the reference indexes and the motion vectors of the current video block as the motion information of the current video block. The motion compensation unit 2905 may generate the predicted video block of the current video block based on the reference video blocks indicated by the motion information of the current video block.

In some examples, the motion estimation unit 2904 may output a full set of motion information for decoding processing of a decoder. Alternatively, in some embodiments, the motion estimation unit 2904 may signal the motion information of the current video block with reference to the motion information of another video block. For example, the motion estimation unit 2904 may determine that the motion information of the current video block is sufficiently similar to the motion information of a neighboring video block.

In one example, the motion estimation unit 2904 may indicate, in a syntax structure associated with the current video block, a value that indicates to the video decoder 300 that the current video block has the same motion information as the another video block.

In another example, the motion estimation unit 2904 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 2900 may predictively signal the motion vector. Two examples of predictive signaling techniques that may be implemented by video encoder 2900 include advanced motion vector predication (AMVP) and merge mode signaling.

The intra prediction unit 2906 may perform intra prediction on the current video block. When the intra prediction unit 2906 performs intra prediction on the current video block, the intra prediction unit 2906 may generate prediction data for the current video block based on decoded samples of other video blocks in the same picture. The prediction data for the current video block may include a predicted video block and various syntax elements.

The residual generation unit 2907 may generate residual data for the current video block by subtracting (e.g., indicated by the minus sign) the predicted video block (s) of the current video block from the current video block. The residual data of the current video block may include residual video blocks that correspond to different sample components of the samples in the current video block.

In other examples, there may be no residual data for the current video block for the current video block, for example in a skip mode, and the residual generation unit 2907 may not perform the subtracting operation.

The transform processing unit 2908 may generate one or more transform coefficient video blocks for the current video block by applying one or more transforms to a residual video block associated with the current video block.

After the transform processing unit 2908 generates a transform coefficient video block associated with the current video block, the quantization unit 2909 may quantize the transform coefficient video block associated with the current video block based on one or more quantization parameter (QP) values associated with the current video block.

The inverse quantization unit 2910 and the inverse transform unit 2911 may apply inverse quantization and inverse transforms to the transform coefficient video block, respectively, to reconstruct a residual video block from the transform coefficient video block. The reconstruction unit 2912 may add the reconstructed residual video block to corresponding samples from one or more predicted video blocks generated by the predication unit 2902 to produce a reconstructed video block associated with the current video block for storage in the buffer 2913.

After the reconstruction unit 2912 reconstructs the video block, loop filtering operation may be performed reduce video blocking artifacts in the video block.

The entropy encoding unit 2914 may receive data from other functional components of the video encoder 2900. When entropy encoding unit 2914 receives the data, entropy encoding unit 2914 may perform one or more entropy encoding operations to generate entropy encoded data and output a bitstream that includes the entropy encoded data.

Figure 30:
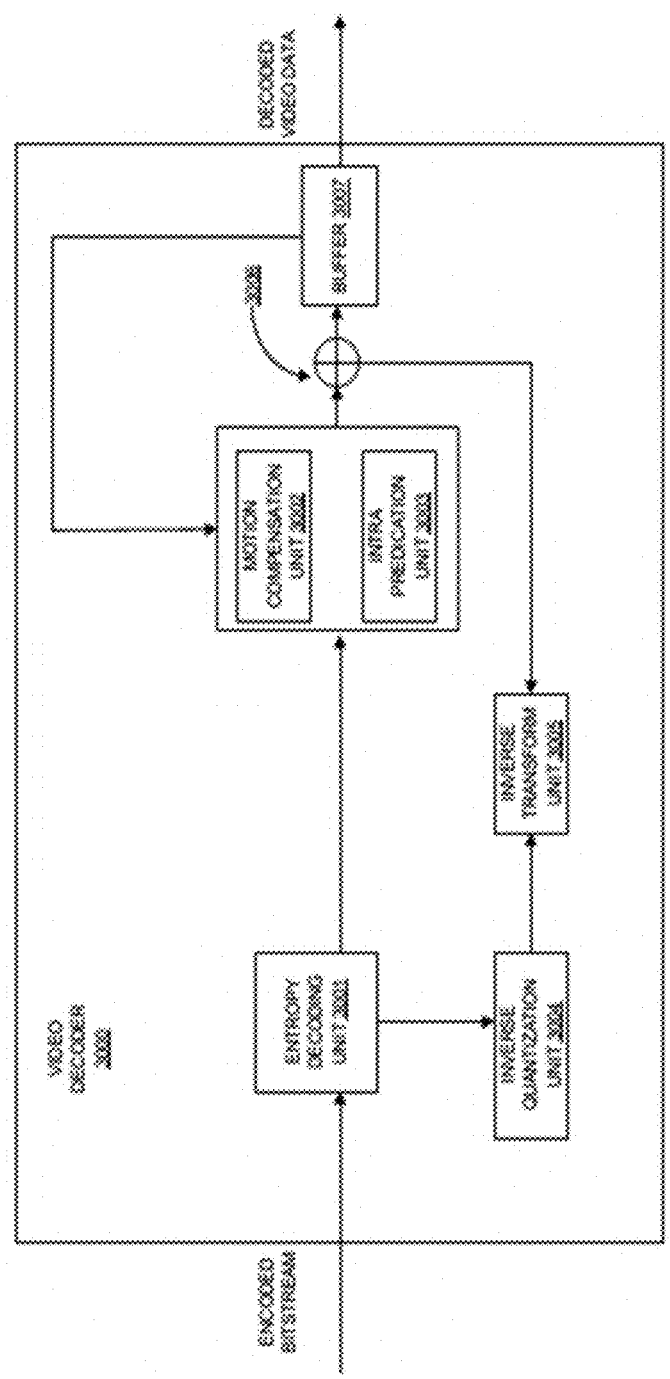
FIG. 30 is a block diagram that illustrates an example video decoder, in accordance with some embodiments of the present disclosure.

FIG. 30 is a block diagram illustrating an example of video decoder 3000, which may be an example of the video decoder 2824 in the system 2800 illustrated in FIG. 28, in accordance with some aspects of the present disclosure.

The video decoder 3000 may be configured to perform any or all of the techniques of this disclosure. In the example of FIG. 30, the video decoder 3000 includes a plurality of functional components. The techniques described in this disclosure may be shared among the various components of the video decoder 3000. In some examples, a processor may be configured to perform any or all of the techniques described in this disclosure.

In the example of FIG. 30, the video decoder 3000 includes an entropy decoding unit 3001, a motion compensation unit 3002, an intra prediction unit 3003, an inverse quantization unit 304, an inverse transformation unit 305, and a reconstruction unit 3006 and a buffer 3007. The video decoder 3000 may, in some examples, perform a decoding pass generally reciprocal to the encoding pass described with respect to video encoder 2900 (FIG. 29).

The entropy decoding unit 3001 may retrieve an encoded bitstream. The encoded bitstream may include entropy coded video data (e.g., encoded blocks of video data). The Entropy decoding unit 3001 may decode the entropy coded video data, and from the entropy decoded video data, the motion compensation unit 3002 may determine motion information including motion vectors, motion vector precision, reference picture list indexes, and other motion information. The motion compensation unit 3002 may, for example, determine such information by performing the AMVP and merge mode. AMVP is used, including derivation of several most probable candidates based on data from adjacent PBs and the reference picture. Motion information typically includes the horizontal and vertical motion vector displacement values, one or two reference picture indices, and, in the case of prediction regions in B slices, an identification of which reference picture list is associated with each index. As used herein, in some aspects, a "merge mode" may refer to deriving the motion information from spatially or temporally neighboring blocks.

The motion compensation unit 3002 may produce motion compensated blocks, possibly performing interpolation based on interpolation filters. Identifiers for interpolation filters to be used with sub-pixel precision may be included in the syntax elements.

The motion compensation unit 3002 may use the interpolation filters as used by video encoder 2900 during encoding of the video block to calculate interpolated values for sub-integer pixels of a reference block. The motion compensation unit 3002 may determine the interpolation filters used by video encoder 2900 according to the received syntax information and use the interpolation filters to produce predictive blocks.

The motion compensation unit 3002 may use at least part of the syntax information to determine sizes of blocks used to encode frame (s) and/or slice (s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence. As used herein, in some aspects, a "slice" may refer to a data structure that can be decoded independently from other slices of the same picture, in terms of entropy coding, signal prediction, and residual signal reconstruction. A slice can either be an entire picture or a region of a picture.

The intra prediction unit 3003 may use intra prediction modes for example received in the bitstream to form a prediction block from spatially adjacent blocks. The inverse quantization unit 3003 inverse quantizes, i.e., de-quantizes, the quantized video block coefficients provided in the bitstream and decoded by entropy decoding unit 3001. Inverse transform unit 3003 applies an inverse transform.

The reconstruction unit 3006 may obtain the decoded blocks, e.g., by sum the residual blocks with the corresponding prediction blocks generated by motion compensation unit 2905 or intra-prediction unit 3003. If desired, a deblocking filter may also be applied to filter the decoded blocks in order to remove blockiness artifacts. The decoded video blocks are then stored in buffer 3007, which provides reference blocks for subsequent motion compensation/intra predication and also produces decoded video for presentation on a display device.

Figure 31:
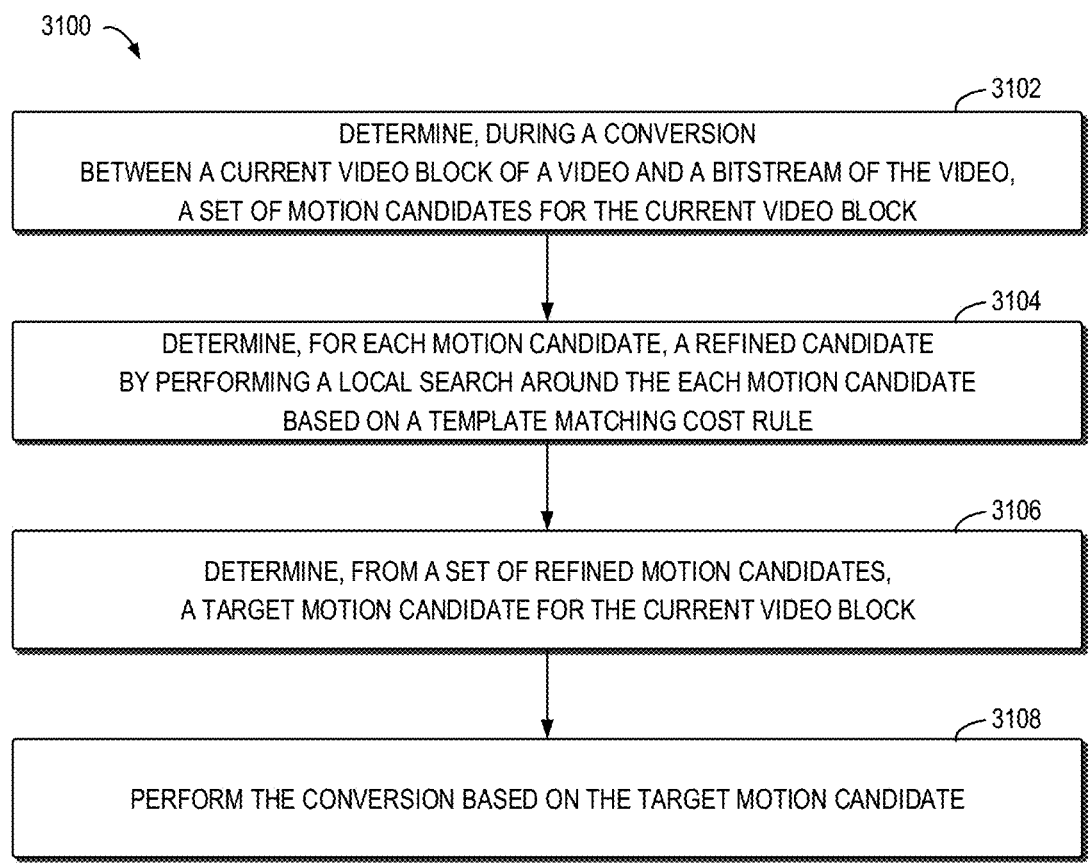
FIG. 31 illustrates a flowchart of an example method of video processing in accordance with some embodiments of the present disclosure.

FIG. 31 illustrates a flowchart of an example method 3100 of video processing in accordance with some embodiments of the present disclosure. The method 3100 may be implemented by the video encoder 2900 in FIG. 29 and/or the video decoder 3000 in FIG. 30. As shown in FIG. 31, at 3102, a set of motion candidates are determined for a current video block during a conversion between the current video block of a video and a bitstream of the video. At 3104, a refined motion candidate is determined for each motion candidate in the set of motion candidates by performing a local search around the each motion candidate based on a template matching cost rule. At 3106, a target motion candidate for the current video block is determined from a set of refined motion candidates generated for the set of motion candidates. At 3108, the conversion is performed based on the target motion candidate.

Figure 32:
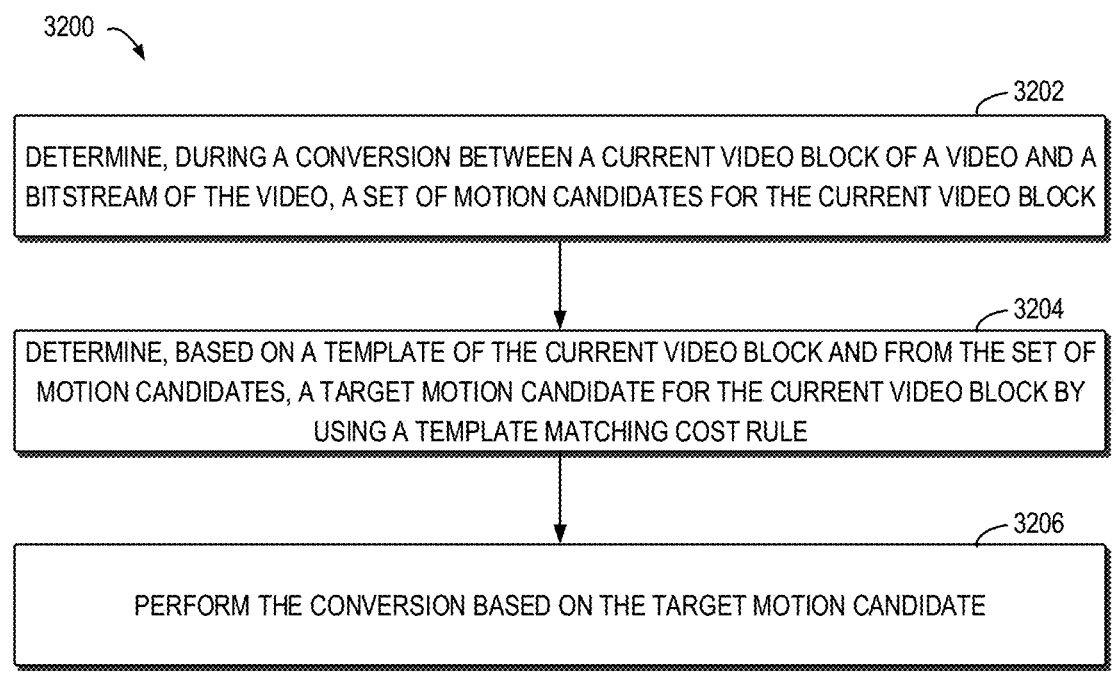
FIG. 32 illustrates a flowchart of an example method of video processing in accordance with some embodiments of the present disclosure.

FIG. 32 illustrates a flowchart of an example method 3200 of video processing in accordance with some embodiments of the present disclosure. The method 3200 may be implemented by the video encoder 2900 in FIG. 29 and/or the video decoder 3000 in FIG. 30. As shown in FIG. 32, at

3202, a set of motion candidates are generated for a current video block during a conversion between the current video block of a video and a bitstream of the video. At 3204, a target candidate for the current video block is determined based on a template of the current video and from the set of motion candidates by using a template matching cost rule. At 3206, the conversion is performed based on the target motion candidate.

In some embodiments, the template is a video region spatially related to the current video block, and the shape of the template is adaptive.

In some embodiments, a template matching cost associated with a motion candidate is calculated based on a difference between the template and a reference template, and the reference template is determined based on the template and the motion candidate.

In some embodiments, a coding mode of the current video block is signaled at one of sequence level, picture level, slice level, sub-picture level, coding tree unit(CTU) level or CU level.

In some embodiments, each motion candidate in the set of motion candidates comprises predicted motion information determined from neighboring video blocks of the current video block.

Figure 33:
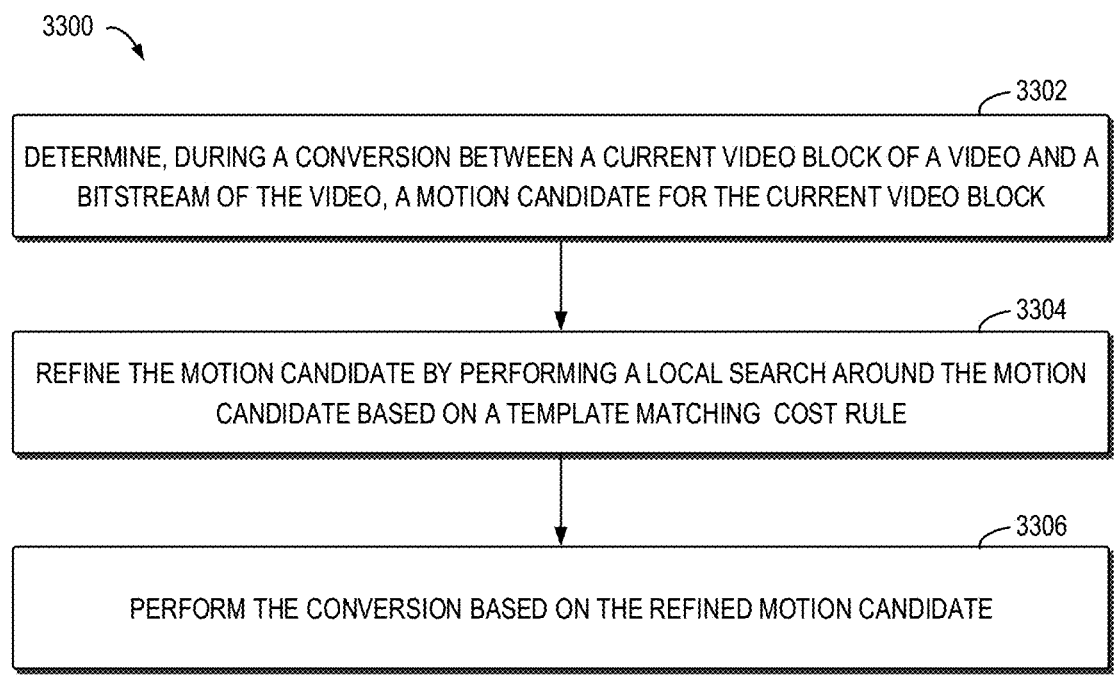
FIG. 33 illustrates a flowchart of an example method of video processing in accordance with some embodiments of the present disclosure.

FIG. 33 illustrates a flowchart of an example method 3300 of video processing in accordance with some embodiments of the present disclosure. The method 3200 may be implemented by the video encoder 2900 in FIG. 29 and/or the video decoder 3000 in FIG. 30. As shown in FIG. 33, at 3302, a motion candidate is determined for a current video block during a conversion between the current video block of a video and a bitstream of the video. At 3304, the motion candidate is refined by performing a local search around the motion candidate based on a template matching cost rule. At 3306, the conversion is performed based on the refined motion candidate. In some embodiments, a search order of the local search is related to a coding mode of the current video block.

Various solutions and embodiments described in the present disclosure are further described using a list of solutions.

Solution 1. A video processing method, comprising: determining, during a conversion between a current video block of a video and a bitstream of the video, a set of motion candidates for the current video block; determining, for each motion candidate in the set of motion candidates, a refined motion candidate by performing a local search around the each motion candidate based on a template matching cost rule; determining, from a set of refined motion candidates generated for the set of motion candidates, a target motion candidate for the current video block; and performing the conversion based on the target motion candidate.

Solution 2. The method of solution 1, wherein the template matching cost rule specifies that the refined motion candidate is associated with the minimum template matching cost.

Solution 3. The method of any of solutions 1-2, wherein the set of motion candidates includes an original motion candidate, and the template matching cost of the original motion candidate is decreased by a factor of the template matching cost. For example, the factor may be one of 1/4, 1/2, 3/4 and so on.

Solution 4. The method of any of solutions 1-3, wherein the current video block is coded with a motion vector predication mode, and wherein determining the target motion candidate for the current video block comprises: selecting, from among the set of refined motion candidates, a refined motion candidate associated with the minimum template matching cost as the target motion candidate.

Solution 5. The method of solution 4, wherein in response to the current video block being coded with the motion vector predication mode, one or more motion vectors for the current video block are determined based on one or more motion vector prediction candidates and at least one motion vector difference, and wherein the at least one motion vector difference is used to refine the one or more motion vectors.

Solution 6. The method of any of solutions 1-3, wherein the current video block is coded with a merge mode, and wherein determining a refined motion candidate by performing a local search based on template matching around the each motion candidate comprises: in response to the each motion candidate comprising first motion information with respect to a first reference picture list, refining the first motion information by performing, between a current picture comprising the current video block and a first reference picture in the first reference list, a first local search based on template matching around the first motion information, the refined first motion information being associated with the minimum template matching cost during the first local search; in response to the each motion candidate comprising second motion information with respect to a second reference picture list, refining the second motion information by performing, between the current picture and a second reference picture in a second reference list, a second local search based on template matching around the second motion information, the refined second motion information being associated with the minimum template matching cost during the second local search; and determining the refined motion candidate including the refined first motion information and/or the refined second motion information.

Solution 7. The method of any of solutions 1-3, wherein the current video block is coded with a merge mode, and wherein determining the target motion candidate for the current video block comprises: selecting, from among the set of refined motion candidates, a refined motion candidate associated with the minimum rate distortion optimization cost as the target motion candidate.

Solution 8. The method of any of solutions 1-7, wherein the current video block is coded with a merge mode, and wherein determining the target motion candidate for the current video block comprises: selecting, from among the set of refined motion candidates, a refined motion candidate associated with the minimum template matching cost as the target motion candidate.

Solution 9. The method of solution 8, wherein each of the refined motion candidates is associated with a first template matching cost related to a first reference picture list and/or a second template matching cost related to a second reference picture list, and wherein: in response to uni-prediction based on the first reference picture list being utilized for a first refined motion candidate in the set of refined motion candidates, the first template matching cost of the first refined motion candidate is used in selecting the target motion candidate; and in response to uni-prediction based on the second reference picture list being utilized for a second refined motion candidate in the set of refined motion candidates, the second template matching cost of the second refined motion candidate is used in selecting the target motion candidate.

Solution 10. The method of solution 9, wherein in response to bi-prediction being utilized for a third refined motion candidate in the set of refined motion candidates, a weighted average of the first and second template matching costs of the third refined motion candidate is used in selecting the target motion candidate.

Solution 11. The method of solution 9, wherein in response to bi-prediction being utilized for a third refined motion candidate in the set of refined motion candidates, a bi-prediction template matching cost of the third refined motion candidate is used in selecting the target motion candidate, and wherein the method further comprises: determining the bi-prediction template matching cost for the third refined motion candidate based on a template of the current video block and a combined reference template generated from a first reference template in the first reference picture list and a second reference template in the second reference picture list, the first and second reference templates being determined based on the third refined motion candidate.

Solution 12. The method of solution 11, wherein the combined reference template is a weighted average of the first reference template and the second reference template.

Solution 13. The method of any of solutions 1-12, wherein performing the local search comprises: determining a plurality of motion candidates around the each motion candidate; determining, based on a template of the current video block and respective motion information indicated by the plurality of motion candidates, a plurality of reference templates to be matched with the template; determining a template matching cost between the template and each reference template in the plurality of reference templates; and selecting, for the each motion candidate, the refined motion candidate associated with the minimum template matching cost from among the plurality of motion candidates.

Additional examples of solutions 1-13 are disclosed in items 1-5 of Section 4.

Solution 14. A video processing method, comprising: determining, during a conversion between a current video block of a video and a bitstream of the video, a set of motion candidates for the current video block; determining, based on a template of the current video block and from the set of motion candidates, a target motion candidate for the current video block by using a template matching cost rule; and performing the conversion based on the target motion candidate; wherein the template is a video region spatially related to the current video block, and the shape of the template is adaptive.

Solution 15. The method of solution 14, wherein a shape of the template is determined based on at least one of the following: block dimensions of the current video block; a coding mode of the current video block; and neighboring information about the current video block.

Solution 16. The method of any of solutions 14, wherein a shape of the template is determined based on a shape of the current video block.

Solution 17. The method of any of solutions 14-16, wherein a shape of the template is communicated between a video encoder and a video decoder.

Solution 18. The method of any of solutions 14-17, wherein the template comprises neighboring samples left to the current video block and/or neighboring samples above to the current video block.

Solution 19. The method of solution 18, wherein a width of the neighboring samples left to the current video block is determined based on a height of the current video block.

Solution 20. The method of solution 19, wherein in response to the height of the current video block not exceeding a predetermined threshold, the width of the neighboring samples left to the current video block is determined as a product of a first factor and the height of the current video block, and wherein in response to the height of the current video block exceeding the predetermined threshold, the width of the neighboring samples left to the current video block is determined as a product of a second factor and the height of the current video block.

Solution 21. The method of solution 18, wherein a height of the neighboring samples above to the current video block is determined based on a width of the current video block.

Solution 22. The method of solution 21, wherein in response to the width of the current video block not exceeding a predetermined threshold, the height of the neighboring samples above to the current video block is determined as a product of a first factor and the width of the current video block, and wherein in response to the width of the current video block exceeding the predetermined threshold, the height of the neighboring samples above to the current video block is determined as a product of a second factor and the width of the current video block.

Solution 23. The method of solution 18, wherein a width of the neighboring samples left to the current video block is determined based on a width of the current video block.

Solution 24. The method of solution 23, wherein in response to the width of the current video block not exceeding a predetermined threshold, the width of the neighboring samples left to the current video block is determined as a product of a first factor and the width of the current video block, and wherein in response to the width of the current video block exceeding the predetermined threshold, the width of the neighboring samples left to the current video block is determined as a product of a second factor and the width of the current video block.

Solution 25. The method of solution 18, wherein a height of the neighboring samples above to the current video block is determined based on a height of the current video block.

Solution 26. The method of solution 25, wherein in response to the height of the current video block not exceeding a predetermined threshold, the height of the neighboring samples above to the current video block is determined as a product of a first factor and the height of the current video block, and wherein in response to the height of the current video block exceeding the predetermined threshold, the height of the neighboring samples above to the current video block is determined as a product of a second factor and the height of the current video block.

Solution 27. The method of any of solutions 20, 22, 24 and 26, wherein the predetermined threshold is 8, the first factor is 1 and the second factor is 2 or 4.

Solution 28. The method of any of solutions 14-27, wherein the template comprises samples neighboring to the current video block and the reference template comprises reference samples corresponding to the samples, and wherein at least a part of the samples and the reference samples are sub-sampled or down-sampled before being used for determining the template matching cost.

Additional examples of solutions 14-28 are disclosed in item 12 of Section 4.

Solution 29. A video processing method, comprising: determining, during a conversion between a current video block of a video and a bitstream of the video, a set of motion candidates for the current video block; determining, based on a template of the current video block and from the set of motion candidates, a target motion candidate for the current video block by using a template matching cost rule; and performing the conversion based on the target motion candidate; wherein a template matching cost associated with a motion candidate is calculated based on a difference between the template and a reference template, and the reference template is determined based on the template and the motion candidate.

Solution 30. The method of solution 29, wherein the difference is determined based on at least one of the following: a sum of absolute differences (SAD), a sum of absolute transformed differences (SATD), a sum of squared differences (SSD), a weighted SAD, a weighted SATD, a weighted SSD, a boundary SAD, a boundary SATD, and a boundary SSD.

Solution 31. The method of solution 29, wherein the template matching cost associated with the motion candidate is determined based on a sum of absolute differences (SAD) between the template and the reference template.

Solution 32. The method of solution 29, wherein the template matching cost associated with the motion candidate is determined based on a sum of absolute transformed differences (SATD) between the template and the reference template.

Solution 33. The method of solution 29, wherein the template matching cost associated with the motion candidate is determined based on a sum of squared differences (SSD) between the template and the reference template.

Solution 34. The method of solution 29, wherein the template matching cost associated with the motion candidate is determined based on at least one of a weighted SAD, a weighted SATD and a weighted SSD between the template and the reference template.

Solution 35. The method of solution 29, wherein the template matching cost associated with the motion candidate is determined based on a boundary SAD between the reference template and reconstructed samples adjacently or non-adjacently neighboring to the template and a SAD between the template and the reference template.

Additional examples of solutions 29-35 are disclosed in item 13 of Section 4.

Solution 36. A video processing method, comprising: determining, during a conversion between a current video block of a video and a bitstream of the video, a set of motion candidates for the current video block; determining, based on a template of the current video block and from the set of motion candidates, a target motion candidate for the current video block by using a template matching cost rule; and performing the conversion based on the target motion candidate; wherein a coding mode of the current video block is signaled at one of sequence level, picture level, slice level, sub-picture level, coding tree unit(CTU) level or CU level.

Solution 37. The method of solution 36, wherein: the coding mode of the current video block is a first merge mode, and the first merge mode is signaled using a CU-level flag as one of merge modes, wherein the merge modes comprise the first merge mode and at least one other merge mode.

Solution 38. The method of solution 37, wherein the at least one other merge mode comprises at least one of the following: a common merge mode, a merge mode with motion vector differences, a combined inter and intra prediction mode, a geometric partitioning mode mode and a subblock merge mode.

Solution 39. The method of any of solutions 37-38, wherein the CU-level flag indicating the first merge mode is coded after a first flag indicating a combination of intra and inter predication mode.

Solution 40. The method of any of solutions 37-38, wherein the CU-level flag indicating the first merge mode is coded before a first flag indicating a combination of intra and inter predication mode.

Solution 41. The method of any of solutions 37-38, wherein the CU-level flag indicating the first merge mode is coded after a second flag indicating a merge mode with motion vector differences.

Solution 42. The method of any of solutions 37-38, wherein the CU-level flag indicating the first merge mode is coded before a second flag indicating a merge mode with motion vector differences.

Additional examples of solutions 36-42 are disclosed in item 16 of Section 4.

Solution 43. A video processing method, comprising: determining, during a conversion between a current video block of a video and a bitstream of the video, at least one set of motion candidates for the current video block, each motion candidate comprising predicted motion information determined from neighboring video blocks of the current video block; determining, based on a template of the current video block and from the at least one set of motion candidates, a target motion candidate for the current video block by using a template matching cost rule; and performing the conversion based on the target motion candidate.

Solution 44. The method of solution 43, wherein the at least one set of motion candidates comprises original motion vector predication candidates followed by all merge candidates in response to the current video block being coded with a motion vector predication mode.

Solution 45. The method of any of solutions 43-44, wherein the at least one set of motion candidates comprises all merge candidates in response to the current video block being coded with a merge mode.

Solution 46. The method of any of solutions 43-45, wherein the at least one set of motion candidates comprises partial original motion vector predication candidates followed by partial merge candidates in response to the current video block being coded with a motion vector predication mode.

Solution 47. The method of any of solutions 43-46, wherein the at least one set of motion candidates comprises partial merge candidates in response to the current video block being coded with a merge mode.

Solution 48. The method of any of solutions 43-47, wherein the at least one set of motion candidates comprises original motion vector predication candidates in response to the current video block being coded with a motion vector predication mode.

Solution 49. The method of any of solutions 43-48, wherein determining the at least one set of motion candidates comprises: determining, from a merge candidate, a motion candidate to be comprised in the at least one set of motion candidates.

Solution 50. The method of solution 49, wherein the current video block is coded with a motion vector predication mode and wherein determining the motion candidate comprises: in response to a reference picture list and a reference index of the merge candidate in a prediction direction being the same as a current reference picture list and a current reference index of the motion vector predication mode respectively, determining the motion candidate comprising predicted motion information of the merge candidate in the prediction direction.

Solution 51. The method of solution 49, wherein the current video block is coded with a motion vector predication mode and wherein determining the motion candidate comprises: in response to a reference picture of the merge candidate in a prediction direction being the same as a current reference picture of the motion vector predication mode, determining the motion candidate comprising predicted motion information of the merge candidate in the prediction direction.

Solution 52. The method of solution 49, wherein the current video block is coded with a merge mode and wherein the at least one set of motion candidates comprises a first set of motion candidates for a first prediction direction and a second set of motion candidates for a second prediction direction.

Solution 53. The method of solution 52, wherein determining the at least one set of motion candidates comprises: incorporating first predicted motion information of the merge candidate in the first prediction direction into the first set of motion candidates; and incorporating second predicted motion information of the merge candidate in the second prediction direction into the second set of motion candidates.

Solution 54. The method of solution 49, wherein the current video block is coded with a merge mode and wherein the at least one set of motion candidates comprises only one set of motion candidates.

Solution 55. The method of solution 54, wherein determining the motion candidate comprises: determining the motion candidate comprising first predicted motion information of the merge candidate in a first prediction direction and second predicted motion information of the merge candidate in a second prediction direction.

Solution 56. The method of solution 43, wherein the current video block is coded with a motion vector predication mode and wherein determining a target motion candidate for the current video block comprises: in response to Adaptive Motion Vector Resolution being enabled, reusing a target motion candidate determined in a first motion vector precision as a target motion candidate in a second motion vector precision different from the first motion vector precision.

Solution 57. The method of solution 43, wherein the number of motion vector predication candidates in a motion vector predication candidate list is set based on whether template matched decoder side motion vector derivation is applied.

Solution 58. The method of solution 57, wherein: in response to template matched decoder side motion vector derivation being applied in a motion vector predication mode, the number of motion vector predication candidates in the motion vector predication candidate list is set to be a first number; and in response to template matched decoder side motion vector derivation being not applied in the motion vector predication mode, the number of motion vector predication candidates in the motion vector predication candidate list is set to be a second number different from the first number.

Solution 59. The method of any of solutions 43-58, wherein determining the at least one set of motion candidates comprises any of the following: determining, based on template matched decoder side motion vector derivation, a motion vector predication candidate to be comprised in a motion vector predication candidate list; or determining, from neighboring video blocks of the current video block, a motion vector predication candidate to be comprised in the motion vector predication candidate list.

Additional examples of solutions 43-59 are disclosed in items 6-8 of Section 4.

Solution 60. A video processing method, comprising: determining, during a conversion between a current video block of a video and a bitstream of the video, a motion candidate for the current video block; refining the motion candidate by performing a local search around the motion candidate based on a template matching cost rule; and performing the conversion based on the refined motion candidate, wherein a search order of the local search is related to a coding mode of the current video block.

Solution 61. The method of solution 60, wherein if the coding mode is a merge mode, the search order is one of the following: integer sample offset searching followed by quarter sample offset searching followed by one-sixteenth sample offset searching; integer sample offset searching followed by quarter sample offset searching; integer sample offset searching followed by half sample offset searching followed by quarter sample offset searching followed by one-sixteenth sample offset searching; integer sample offset searching followed by half sample offset searching followed by quarter sample offset searching followed by one-eighth sample offset searching followed by one-sixteenth sample offset searching; or integer sample offset searching followed by half sample offset searching followed by quarter sample offset searching.

Solution 62. The method of solution 60, wherein if the coding mode is a motion vector predication mode, the search order is one of the following: integer sample offset searching followed by quarter sample offset searching followed by one-sixteenth sample offset searching; integer sample offset searching followed by quarter sample offset searching; or integer sample offset searching followed by half sample offset searching followed by quarter sample offset searching.

Solution 63. The method of any of solutions 60-62, wherein performing the local search comprises: determining a starting search point for the local search based on a template of the current video block and motion information indicated by the motion candidate; performing a first round of integer sample offset searching from the starting search point based on a first search pattern, wherein the first round of the integer sample offset searching is terminated in response to a first search point acting as a center point of the first search pattern and associated with the minimum template matching cost being found; performing a second round of the integer sample offset searching from the first search point based on a second search pattern, wherein the second round of the integer sample offset searching is terminated in response to a second search point associated with the minimum template matching cost being found; and determining the refined motion candidate based on the second search point.

Solution 64. The method of solution 63, wherein determine the refined motion candidate based on the second search point comprises: in response to the local search comprising no fractional sample offset searching, determining the refined motion candidate corresponding to the second search point.

Solution 65. The method of solution 63, wherein determining the refined motion candidate based on the second search point comprises: in response to the local search comprising fractional sample offset searching, performing the fractional sample offset searching from the second search point based on the second search pattern, to determine a final search point associated with the minimum template matching cost during the fractional sample offset searching; and determining the refined motion candidate corresponding to the final search point.

Solution 66. The method of any of solutions 63-66, wherein the first search pattern is an unrestricted center-biased diamond search pattern and the second search pattern is a cross search pattern.

Solution 67. The method of any of solutions 60-66, wherein a search range of the local search is determined based on a predetermined number of luminance samples.

Solution 68. The method of any of solutions 60-67, wherein the local search comprises integer sample offset searching and fractional sample offset searching, and performing the local search comprises: determining an integer sample offset for the integer sample offset searching; performing the integer sample offset searching based on the integer sample offset; determining a fractional sample offset for the fractional sample offset searching by using a parametric error surface equation; and performing the fractional sample offset searching based on a result of the integer sample offset searching and the fractional sample offset.

Solution 69. The method of solution 68, wherein the integer sample offset searching is terminated in response to a search point associated with the minimum template matching cost being found, and determining the fractional sample offset comprises: using a template matching cost of the search point and respective template matching costs of a plurality of neighboring search points to fit the parametric error surface equation; and determining the fractional sample offset by solving the parametric error surface equation based on the minimum template matching cost.

Solution 70. The method of any of solutions 68-69, wherein performing the fractional sample offset searching comprises: in response to the integer sample offset searching being terminated with a search point associated with the minimum template matching cost being found, performing the fractional sample offset searching to derive the refined motion candidate by adding the fractional sample offset to a motion candidate corresponding to the search point.

Additional examples of solutions 60-70 are disclosed in items 9-11 of Section 4.

Solution 71. The method of any of solutions 1-70, wherein the method is only performed at CU-level. For example, the method may not be performed at subblock-level.

Additional examples of solution 71 are disclosed in item 14 of Section 4.

Solution 72. The method of any of solutions 1-70, wherein the method is applied for a Luma component.

Solution 73. The method of any of solutions 1-70, wherein the method is applied for at least one Chroma component.

Solution 74. The method of any of solutions 1-70, wherein different template shapes and/or different matching rules are applied for different components.

Additional examples of solutions 72-74 are disclosed in item 15 of Section 4.

Solution 75. The method of any of solutions 1-70, wherein the conversion comprises encoding the current video block into the bitstream.

Solution 76. The method of any of solutions 1-70, wherein the conversion comprises decoding the current video block from the bitstream.

Solution 77. An apparatus for processing video data comprising a processor and a non-transitory memory with instructions thereon, wherein the instructions upon execution by the processor, cause the processor to perform the method of any of solutions 1 to 76.

Solution 78. A non-transitory computer-readable storage medium storing instructions that cause a processor to perform the method of any of solutions 1 to 76.

Solution 79. A non-transitory computer-readable recording medium storing a bitstream of a video which is generated by the method of any of solutions 1 to 76 performed by a video processing apparatus.

The functionalities described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out the methods of the subject matter described herein may be written in any combination of one or more programming languages. The program code may be provided to a processor or controller of a general-purpose computer, special purpose computer, or other programmable data processing apparatus such that the program code, when executed by the processor or controller, causes the functions/operations specified in the flowcharts and/or block diagrams to be implemented. The program code may be executed entirely or partly on a machine, executed as a stand-alone software package partly on the machine, partly on a remote machine, or entirely on the remote machine or server.

In the context of this disclosure, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations are performed in the particular order shown or in sequential order, or that all illustrated operations are performed to achieve the desired results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single implementation. Rather, various features described in a single implementation may also be implemented in multiple embodiments separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

Figure 34:
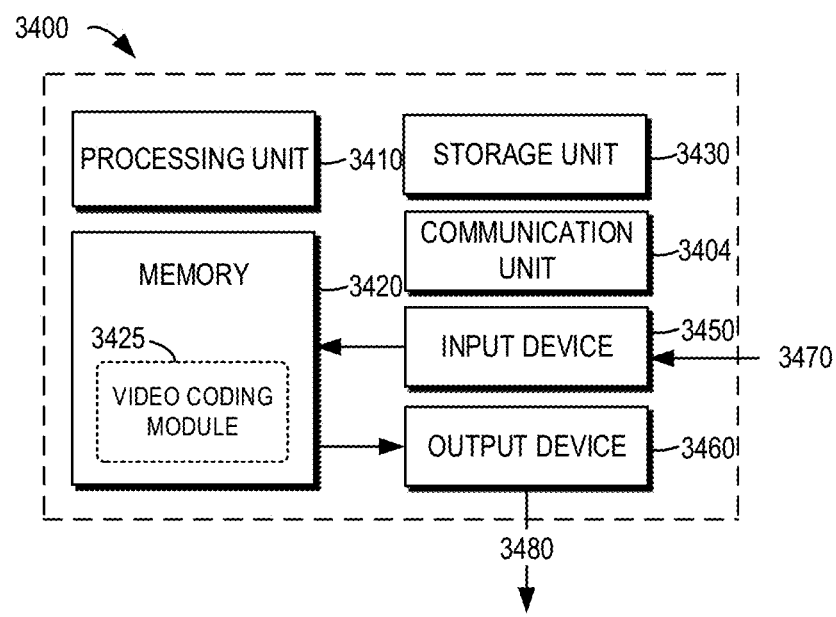
FIG. 34 illustrates a block diagram of a computing device in which various embodiments of the present disclosure can be implemented.

FIG. 34 illustrates a block diagram of a computing device 3400 in which various embodiments of the present disclosure can be implemented. The computing device 3400 may be implemented as or included in the source device 2810 (or the video encoder 2814 or 2900) or the destination device 2820 (or the video decoder 2824 or 3000).

It would be appreciated that the computing device 3400 shown in FIG. 34 is merely for purpose of illustration, without suggesting any limitation to the functions and scopes of the present disclosure in any manner.

As shown in FIG. 34, the computing device 3400 may be a general-purpose computing device. The computing device 3400 may at least comprise one or more processors or processing units 3410, a memory 3420, a storage device 3430, one or more communication units 3440, one or more input devices 3450, and one or more output devices 3460.

In some embodiments, the computing device 3400 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 3400 can support any type of interface to a user (such as "wearable" circuitry and the like).

The processing unit 3410 may be a physical or virtual processor and can implement various processes based on programs stored in the memory 3420. In a multi-processor system, multiple processing units execute computer executable instructions in parallel so as to improve the parallel processing capability of the computing device 3400. The processing unit 3410 may also be referred to as a central processing unit (CPU), a microprocessor, a controller or a microcontroller.

The computing device 3400 typically includes various computer storage medium.

Such medium can be any medium accessible by the computing device 3400, including, but not limited to, volatile and non-volatile medium, or detachable and non-detachable medium. The memory 3420 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage device 3430 may be any detachable or non-detachable medium and may include a machine-readable medium such as a memory, flash memory drive, magnetic disk or another other media, which can be used for storing information and/or data and can be accessed in the computing device 3400.

The computing device 3400 may further include additional detachable/non-detachable, volatile/non-volatile memory medium. Although not shown in FIG. 34, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 3440 communicates with a further computing device via the communication medium. In addition, the functions of the components in the computing device 3400 can be implemented by a single computing cluster or multiple computing machines that can communicate via communication connections. Therefore, the computing device 3400 can operate in a networked environment using a logical connection with one or more other servers, networked personal computers (PCs) or further general network nodes.

The input device 3450 may be one or more of a variety of input devices, such as a mouse, keyboard, tracking ball, voice-input device, and the like. The output device 3460 may be one or more of a variety of output devices, such as a display, loudspeaker, printer, and the like. By means of the communication unit 3440, the computing device 3400 can further communicate with one or more external devices (not shown) such as the storage devices and display device, with one or more devices enabling the user to interact with the computing device 3400, or any devices (such as a network card, a modem and the like) enabling the computing device 3400 to communicate with one or more other computing devices, if required. Such communication can be performed via input/output (I/O) interfaces (not shown).

In some embodiments, instead of being integrated in a single device, some or all components of the computing device 3400 may also be arranged in cloud computing architecture. In the cloud computing architecture, the components may be provided remotely and work together to implement the functionalities described in the present disclosure. In some embodiments, cloud computing provides computing, software, data access and storage service, which will not require end users to be aware of the physical locations or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 3400 may be used to implement video encoding/decoding in embodiments of the present disclosure. The memory 3420 may include one or more video coding modules 3425 having one or more program instructions. These modules are accessible and executable by the processing unit 3410 to perform the functionalities of the various embodiments described herein.

In the example embodiments of performing video encoding, the input device 3450 may receive video data as an input 3470 to be encoded. The video data may be processed, for example, by the video coding module 3425, to generate an encoded bitstream. The encoded bitstream may be provided via the output device 3460 as an output 3480.

In the example embodiments of performing video decoding, the input device 3450 may receive an encoded bitstream as the input 3470. The encoded bitstream may be processed, for example, by the video coding module 3425, to generate decoded video data. The decoded video data may be provided via the output device 3460 as the output 3480.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was disabled based on the decision or determination.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in the present disclosure can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While the present disclosure contains many specifics, these should not be construed as limitations on the scope of any invention or of what may be claimed, but rather as descriptions of features that may be specific to particular embodiments of particular inventions. Certain features that are described in the present disclosure in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

I claim:

1. A video processing method, comprising:
   determining, during a conversion between a current video block of a video and a bitstream of the video, a set of motion candidates for the current video block, wherein the set of motion candidates includes an original motion candidate;
   determining, for each motion candidate in the set of motion candidates, a refined motion candidate by performing a local search around the each motion candidate based on a template matching cost rule, wherein a template matching cost of the original motion candidate is decreased by a factor of the template matching cost;
   determining, from a set of refined motion candidates generated for the set of motion candidates, a target motion candidate for the current video block; and
   performing the conversion based on the target motion candidate.

2. The method of claim 1, wherein the template matching cost rule specifies that the refined motion candidate is associated with a minimum template matching cost.

3. The method of claim 1, wherein the current video block is coded with a motion vector predication mode, and wherein determining the target motion candidate for the current video block comprises:
   selecting, from among the set of refined motion candidates, a refined motion candidate associated with a minimum template matching cost as the target motion candidate.

4. The method of claim 3, wherein in response to the current video block being coded with the motion vector predication mode, one or more motion vectors for the current video block are determined based on one or more motion vector prediction candidates and at least one motion vector difference, and wherein the at least one motion vector difference is used to refine the one or more motion vectors.

5. The method of claim 1, wherein the current video block is coded with a merge mode, and
   wherein determining a refined motion candidate by performing a local search based on template matching around the each motion candidate comprises:
   in response to the each motion candidate comprising first motion information with respect to a first reference picture list,
      refining the first motion information by performing, between a current picture comprising the current video block and a first reference picture in the first reference list, a first local search based on template matching around the first motion information, the refined first motion information being associated with the minimum template matching cost during the first local search;
   in response to the each motion candidate comprising second motion information with respect to a second reference picture list,
      refining the second motion information by performing, between the current picture and a second reference picture in a second reference list, a second local search based on template matching around the second motion information, the refined second motion information being associated with a minimum template matching cost during the second local search; and
   determining the refined motion candidate including the refined first motion information and/or the refined second motion information.

6. The method of claim 1, wherein the current video block is coded with a merge mode, and wherein determining the target motion candidate for the current video block comprises:
   selecting, from among the set of refined motion candidates, a refined motion candidate associated with a minimum rate distortion optimization cost as the target motion candidate.

7. The method of claim 1, wherein the current video block is coded with a merge mode, and wherein determining the target motion candidate for the current video block comprises:
   selecting, from among the set of refined motion candidates, a refined motion candidate associated with a minimum template matching cost as the target motion candidate.

8. The method of claim 7, wherein each of the refined motion candidates is associated with a first template matching cost related to a first reference picture list and/or a second template matching cost related to a second reference picture list, and wherein:
   in response to uni-prediction based on the first reference picture list being utilized for a first refined motion candidate in the set of refined motion candidates, the first template matching cost of the first refined motion candidate is used in selecting the target motion candidate; and
   in response to uni-prediction based on the second reference picture list being utilized for a second refined motion candidate in the set of refined motion candidates, the second template matching cost of the second refined motion candidate is used in selecting the target motion candidate.

9. The method of claim 8, wherein in response to bi-prediction being utilized for a third refined motion candidate in the set of refined motion candidates, a weighted average of the first and second template matching costs of the third refined motion candidate is used in selecting the target motion candidate.

10. The method of claim 8, wherein in response to bi-prediction being utilized for a third refined motion candidate in the set of refined motion candidates, a bi-prediction template matching cost of the third refined motion candidate is used in selecting the target motion candidate, and wherein the method further comprises:
determining the bi-prediction template matching cost for the third refined motion candidate based on a template of the current video block and a combined reference template generated from a first reference template in the first reference picture list and a second reference template in the second reference picture list, the first and second reference templates being determined based on the third refined motion candidate.

11. The method of claim 10, wherein the combined reference template is a weighted average of the first reference template and the second reference template.

12. The method of claim 1, wherein performing the local search comprises:
determining a plurality of motion candidates around the each motion candidate;
determining, based on a template of the current video block and respective motion information indicated by the plurality of motion candidates, a plurality of reference templates to be matched with the template;
determining a template matching cost between the template and each reference template in the plurality of reference templates; and
selecting, for the each motion candidate, the refined motion candidate associated with a minimum template matching cost from among the plurality of motion candidates.

13. The method of claim 12, wherein a shape of the template is determined based on at least one of the following:
block dimensions of the current video block;
a coding mode of the current video block; and
neighboring information about the current video block.

14. The method of claim 12, wherein a shape of the template is determined based on a shape of the current video block.

15. The method of claim 12, wherein a shape of the template is communicated between a video encoder and a video decoder.

16. The method of claim 1, wherein a coding mode of the current video block is signaled at one of sequence level, picture level, slice level, sub-picture level, coding tree unit(CTU) level or CU level.

17. The method of claim 16, wherein:
the coding mode of the current video block is a first merge mode, and
the first merge mode is signaled using a CU-level flag as one of merge modes, wherein the merge modes comprise the first merge mode and at least one other merge mode.

18. The method of claim 17, wherein the at least one other merge mode comprises at least one of the following: a common merge mode, a merge mode with motion vector differences, a combined inter and intra prediction mode, a geometric partitioning mode mode and a subblock merge mode.

19. The method of claim 1, wherein the conversion comprises encoding the current video block into the bitstream.

20. The method of claim 1, wherein the conversion comprises decoding the current video block from the bitstream.

21. An apparatus for processing video data comprising a processor and a non-transitory memory with instructions thereon, wherein the instructions upon execution by the processor, cause the processor to:
determine, during a conversion between a current video block of a video and a bitstream of the video, a set of motion candidates for the current video block, wherein the set of motion candidates includes an original motion candidate;
determine, for each motion candidate in the set of motion candidates, a refined motion candidate by performing a local search around the each motion candidate based on a template matching cost rule, wherein a template matching cost of the original motion candidate is decreased by a factor of the template matching cost;
determine, from a set of refined motion candidates generated for the set of motion candidates, a target motion candidate for the current video block; and
perform the conversion based on the target motion candidate.

22. A non-transitory computer-readable recording medium storing a bitstream of a video which is generated by a method performed by a video processing apparatus, wherein the method comprises:
determining, during a conversion between a current video block of a video and a bitstream of the video, a set of motion candidates for the current video block, wherein the set of motion candidates includes an original motion candidate;
determining, for each motion candidate in the set of motion candidates, a refined motion candidate by performing a local search around the each motion candidate based on a template matching cost rule, wherein a template matching cost of the original motion candidate is decreased by a factor of the template matching cost;
determining, from a set of refined motion candidates generated for the set of motion candidates, a target motion candidate for the current video block; and
performing the conversion based on the target motion candidate.

* * * * *